United States Patent
Gothekar et al.

(10) Patent No.: US 12,468,825 B2
(45) Date of Patent: Nov. 11, 2025

(54) SHARING AND PROTECTING SECURED SUBORDINATE DEVICES ON AN UNSECURED BUS

(71) Applicant: QUALCOMM Incorporated, San Diego, CA (US)

(72) Inventors: Arun Gothekar, Hyderabad (IN); Nileena Pathalayi Alakandy, Bangalore (IN); Ravi Gupta, San Diego, CA (US); Gur Prasad Srivastava, Bengaluru (IN); Rajesh Chava, Khammam (IN); Mukesh Kumar Pravinbhai Savaliya, Hyderabad (IN); Bhavya Soneta, Indore (IN)

(73) Assignee: Qualcomm Incorporated, San Diego, CA (US)

( * ) Notice: Subject to any disclaimer, the term of this patent is extended or adjusted under 35 U.S.C. 154(b) by 89 days.

(21) Appl. No.: 18/432,819

(22) Filed: Feb. 5, 2024

(65) Prior Publication Data
US 2025/0252198 A1 Aug. 7, 2025

(51) Int. Cl.
G06F 21/60 (2013.01)
G06F 13/42 (2006.01)

(52) U.S. Cl.
CPC ........ *G06F 21/606* (2013.01); *G06F 13/4282* (2013.01)

(58) Field of Classification Search
None
See application file for complete search history.

(56) References Cited

U.S. PATENT DOCUMENTS

| | | | | |
|---|---|---|---|---|
| 7,260,726 B1* | 8/2007 | Doe | ........................ | G06F 21/34 713/184 |
| 8,996,864 B2* | 3/2015 | Maigne | ............... | G06F 9/45558 726/4 |
| 10,691,803 B2* | 6/2020 | Liguori | ................... | G06F 21/53 |
| 10,963,167 B2* | 3/2021 | Hugot | ................... | G06F 3/0622 |
| 11,914,877 B2* | 2/2024 | Talmor | ................... | G06F 3/0659 |
| 12,216,769 B2* | 2/2025 | Ponsini | ................... | G06F 21/60 |
| 2014/0173692 A1* | 6/2014 | Srinivasan | ............ | H04W 12/02 726/4 |
| 2020/0067984 A1* | 2/2020 | Fausak | ................... | H04L 63/08 |

* cited by examiner

*Primary Examiner* — Backhean Tiv
(74) *Attorney, Agent, or Firm* — Loza & Loza, LLP

(57) ABSTRACT

A peripheral controller includes a serial engine configured to provide an interface to a serial bus, a multiplexer configured to select between transactions directed to the serial bus and initiated in a plurality of execution environments, and an access control circuit configured to determine when a first transaction to be executed over the serial bus is initiated from a first execution environment, enforce an access policy when the first execution environment is a secured execution environment, determine when a second transaction is initiated from a second execution environment, block the second execution environment and a peripheral device from accessing the serial bus when the first execution environment is accessing the serial bus, and provide the second execution environment and the peripheral device access to the serial bus when the second execution environment is an unsecured execution environment. The access policy may be based on an address of a peripheral device.

20 Claims, 12 Drawing Sheets

SHARING AND PROTECTING SECURED SUBORDINATE DEVICES ON AN UNSECURED BUS

TECHNICAL FIELD

The present disclosure relates generally to integrated circuit technology and, more particularly to sharing serial communication links for secured and unsecured transactions.

BACKGROUND

Mobile communication devices typically include a variety of components such as circuit boards, integrated circuit (IC) devices, application-specific integrated circuit (ASIC) devices and/or System-on-Chip (SoC) devices. The types of components may include processing circuits, user interface components, storage and other peripheral components that communicate over a serial bus. State-of-the-art mobile application devices demand a small form factor, low cost, a tight power budget, and high electrical performance. For example, wearable processing and communication devices require SoCs and other IC devices that offer higher performance with reduced power requirements in smaller form-factors. Mobile package design has evolved to meet these divergent goals for enabling mobile applications that support multimedia enhancements.

Chiplet technology can be used to address some of the performance, power, size and other design requirements. Chiplets are a product of improved semi-conductor processing and logic design and can provide an increase in the quantity of logic circuits that can be included in integrated circuit devices. A processing system can be separated into subsystems that may be implemented as individual chiplets. An SoC can be optimized or customized by assembling a subset of available chiplets. The assembled chiplets may communicate with each other via one or more intra-chip data buses or similar data communication interconnects. A mobile application device may include multiple SoCs that communicate with each other via similar inter-chip interconnects.

Interconnects between IC devices and between chiplets can be implemented using some combination of point-to-point interfaces and multi-drop buses. Interconnect architectures may be based on a variety of technologies, including Peripheral Component Interconnect Express (PCIe), Universal Serial Bus, and others. In some systems, secured and unsecured interconnects are needed between certain combinations of devices. In conventional systems, dedicated interconnects are used to support secure communication and these dedicated interconnects can further increase bandwidth demand within complex systems.

SUMMARY

Certain aspects of the disclosure relate to apparatus, methods, techniques and schemes by which a serial bus can be shared between secured and non-secured applications. In some examples, access control logic may be provided in a peripheral controller. In some instances, the access control logic may be implemented in a bus controller that manages access to bus interfaces.

In various aspects of the disclosure, a peripheral controller includes a serial engine configured to provide an interface to a serial bus, a multiplexer configured to select between transactions directed to the serial bus and initiated in a plurality of execution environments, and an access control circuit. The access control circuit may be configured to determine when a first transaction to be executed over the serial bus is initiated from a first execution environment, enforce an access policy when the first execution environment is a secured execution environment, determine when a second transaction to be executed over the serial bus is initiated from a second execution environment, block the second execution environment and one or more peripheral devices from accessing the serial bus when the first execution environment is accessing the serial bus, and provide the second execution environment and one or more peripheral devices with access to the serial bus when the second execution environment is an unsecured execution environment. The access policy may be based on an address of a peripheral device that is an intended participant in the first transaction.

In various aspects of the disclosure, a method for managing access to a serial bus includes determining that a first transaction to be executed over the serial bus is initiated from a first execution environment, enforcing an access policy for secured use of the serial bus when the first execution environment is a secured execution environment, the access policy being based on an address of a peripheral device that is an intended participant in the first transaction, determining that a second transaction to be executed over the serial bus is initiated from a second execution environment, blocking the second execution environment and one or more peripheral devices from accessing the serial bus when the first execution environment is accessing the serial bus, and providing access to the serial bus to the second execution environment and one or more peripheral devices when the second execution environment is an unsecured execution environment In various aspects of the disclosure, a processor-readable storage medium stores code that, when executed by a processor causes a processing circuit to determine when a first transaction to be executed over the serial bus is initiated from a first execution environment, enforce an access policy for secured use of the serial bus when the first execution environment is a secured execution environment, the access policy being based on an address of a peripheral device that is an intended participant in the first transaction, determine when a second transaction to be executed over the serial bus is initiated from a second execution environment, block the second execution environment and one or more peripheral devices from accessing the serial bus when the first execution environment is accessing the serial bus, and provide access to the serial bus to the second execution environment and one or more peripheral devices when the second execution environment is an unsecured execution environment.

In certain aspects, the address of the peripheral device that is an intended participant in the first transaction may include a subordinate device identifier assigned according to a bus protocol and an identifier of the serial bus.

In certain aspects, the access control circuit is provided in the serial engine. The access control circuit may be provided in a peripheral controller that includes the serial engine. The access control circuit may include a lookup table that identifies aspects of the access policy relating to a command in the first transaction. The access control circuit may include a lookup table that identifies aspects of the access policy that relate to the first execution environment. The access control circuit may include a lookup table that identifies aspects of the access policy that relate to the address of the peripheral device. The access control circuit may include a lookup table that identifies authorized participants to the transaction and an authorized command. The access control circuit may be further configured to permit the first transaction to be executed over the serial bus when an authorized participant and an authorized command are identified by the lookup table.

DETAILED DESCRIPTION

Figure 1:
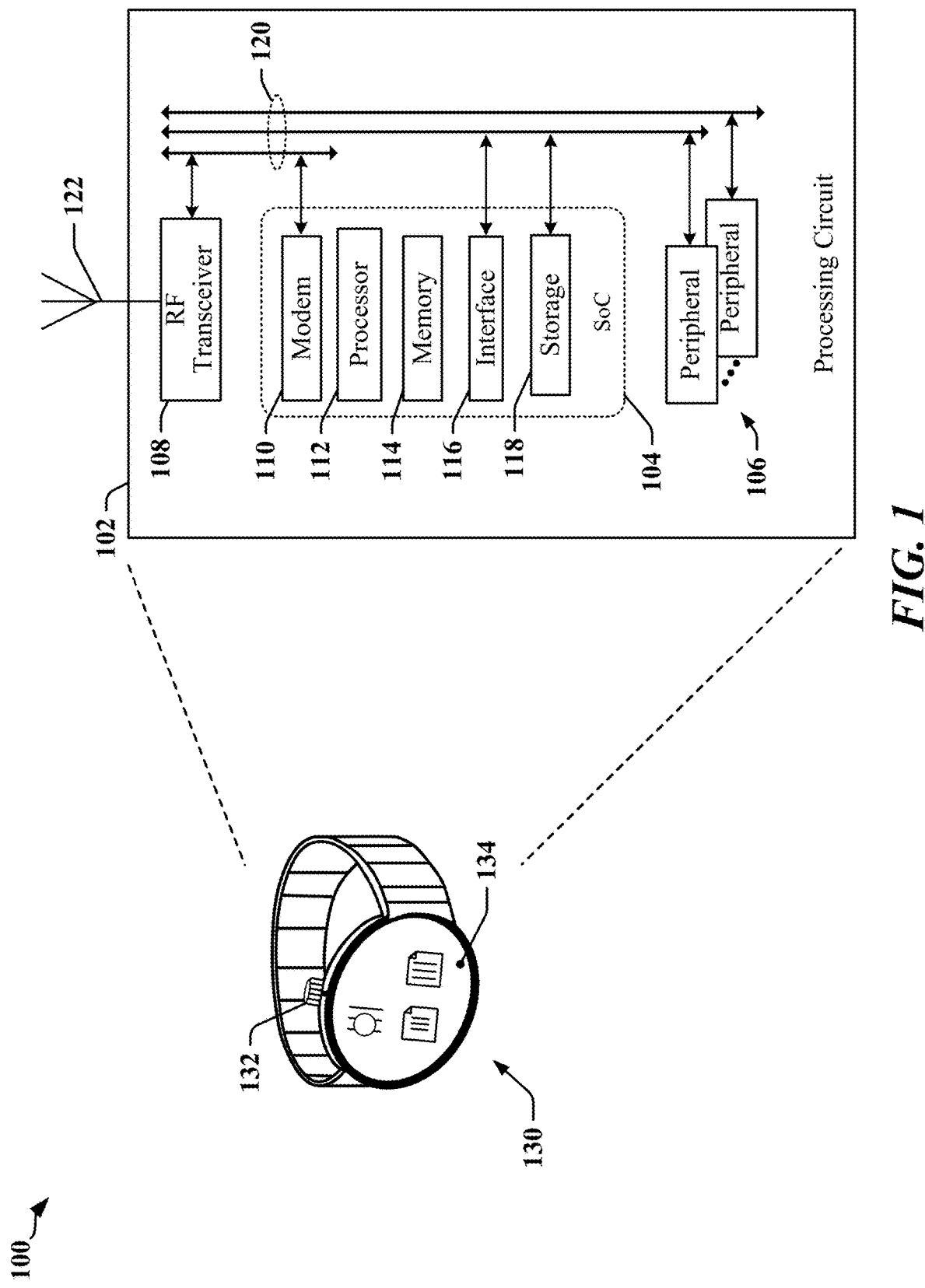
FIG. 1 illustrates an apparatus employing interconnected chiplets.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Data communication links employed by SoCs and other IC devices to connect processors with modems and other peripherals may be operated in accordance with industry or proprietary standards or protocols associated with certain functions or types of devices. In one example, the peripheral component interconnect express (PCIe) standard is a high-speed interface that enables transmission over a high-speed link at data rates measured in gigabits per second. A high-speed interface operated in accordance with PCIe standards and protocols has multiple standby modes when the link is inactive. In operation, one device acts as a host that can communicate through PCIe links with multiple devices, which may be referred to as endpoints. In a PCIe link, data is transmitted in differential signals over one or more two-line lanes. Lanes may provide duplex, serial point-to-point connections.

Serial data links may be used to interconnect certain electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, or any other similar functioning device.

Certain aspects of the disclosure relate to serial bus configurations in which two or more devices can communicate at different times. The described serial buses are typically operated in a hierarchical manner, in that one device controls communication during a transaction. The controlling device may be referred to as a host device, a bus master device, a managing device or another term favored by standards defining the protocols implemented by the controlling device. In some serial bus configurations, a single controlling device manages or controls communication during all transactions conducted over the serial bus. In other serial bus configurations, more than one device can operate as the controlling device while another device serves as the controlling device for a transaction conducted over the serial bus. The controlling device may provide control signaling that facilitates clock synchronization and that identifies a type of transaction to be conducted over a conventional two-wire serial bus. The receiving devices may be referred to as a client device, a slave device, a subordinate device, a peripheral device or another term favored by standards defining the protocols implemented by the controlling device. For the purposes of this disclosure, a controlling device may be referred to as a host device and associated receiving devices may be referred to as subordinate devices.

FIG. 1 illustrates an example of an apparatus 100 that may be implemented using multiple chiplets coupled through one or more data communication buses. The apparatus may be enclosed within a wearable device, such as the illustrated smartwatch 130. A processing circuit 102 of the apparatus 100 includes multiple circuits or devices 104, 106 and/or 108. In various examples, the processing circuit 102 is implemented using one or more ASICs, chiplets, an SoC or other devices arranged in a configuration that can be adapted for use in mobile computing, embedded computing, edge computing. In one example, the apparatus 100 may be configured to support multiple communication technologies, modes or protocols and the processing circuit 102 includes a combination of devices including an SoC 104, one or more peripheral devices 106, and a transceiver 108 that cooperate to enable the apparatus to communicate through an antenna 122 with a radio access network, a core access network, the Internet and/or another network.

The SoC 104 may include one or more processors 112, one or more modems 110, on-board memory 114, a bus interface circuit 116 and/or other logic circuits or functions. The processing circuit 102 may be controlled by an operating system that provides an application programming interface (API) layer that enables the one or more processors 112 to execute software modules residing in the on-board memory 114 or other processor-readable storage 118 provided on the processing circuit 102. The software modules may include instructions and data stored in the on-board memory 114 or processor-readable storage 118. The SoC 104 may access its on-board memory 114, the processor-readable storage 118, and/or storage external to the processing circuit 102. The on-board memory 114, the processor-readable storage 118 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 122, a display 134, operator controls 132, switches or buttons, among other components. A user interface module may be configured to manage the display 134, operator controls 132, etc. and may communicate with other elements of the processing circuit 102 through one or more serial data interconnects.

The processing circuit 102 may provide multiple buses 120 that enable communication between two or more devices 104, 106, and/or 108. In one example, the SoC 104 may include bus interface circuits 116 coupled to one or more of the buses 120. Each of the bus interface circuits 116 may include a combination of circuits, counters, timers, control logic and other configurable circuits or modules. In one example, certain bus interface circuits 116 may be configured to operate in accordance with standards-defined communication specifications or protocols. The processing circuit 102 may include or control a power management function that configures and manages the operation of the apparatus 100.

The illustrated smartwatch 130, other portable or wearable processing and/or communication devices (referred to collectively as portable communication devices or PCDs), sensors, instruments, appliances and other such devices include one or more ICs. These devices may include mobile phones, tablet computers, palmtop computers, portable digital assistants (PDAs), portable game consoles, and other portable electronic devices. PCDs commonly contain integrated circuits or SoCs that include numerous components or subsystems designed to work together to deliver functionality to a user. The various SoC subsystems may communicate with each other via one or more intra-chip data buses or similar data communication interconnects. PCDs may have multiple SoCs that communicate with each other via similar inter-chip interconnects. The ICs are typically packaged in an IC package, which may be referred to as a "semiconductor package" or "chip package." The IC package typically includes a package substrate and one or more IC chips or other electronic modules mounted to the package substrate to provide electrical connectivity to the IC chips. For example, an IC chip in an IC package may be configured as an SoC. The IC chips are electrically coupled to other IC chips and/or to other components in the IC package through electrical coupling to metal lines in the package substrate. The IC chips can also be electrically coupled to other circuits outside the IC package through electrical connections of external metal interconnects (e.g., solder bumps) of the IC package.

Process technology employed to manufacture semiconductor devices, including IC devices is continually improving. Process technology includes the manufacturing methods used to make IC devices and defines transistor size, operating voltages and switching speeds. Features that are constituent elements of circuits in an IC device may be referred as technology nodes and/or process nodes. The terms technology node, process node, process technology may be used to characterize a specific semiconductor manufacturing process and corresponding design rules. Faster and more power-efficient technology nodes are being continuously developed through the use of smaller feature size to produce smaller transistors that enable the manufacture of higher-density ICs. Design rules for newer process technology that use low-voltage transistors may preclude the use of higher voltage transistors supported by previous process technology generations. The unavailability of certain higher-voltage transistors may present an impediment to circuit designers for IC devices that include multiple voltage domains.

The increasing complexity and functionality required from semiconductor devices tends to increase the physical dimensions of integrated circuit devices in which they are embodied. An upper limit on integrated circuit device is the maximum "reticle" size that in some instances refers to the size of the photomask used to manufacture the integrated circuit devices. Chiplets provide one approach to avoiding the maximum reticle size. Moreover, chiplet technology can be used to address some of the performance, power and size design requirements for complex SoCs, including SoCs used in certain mobile or wearable devices. The use of smaller dies can improve manufacturing yields.

Figure 2:
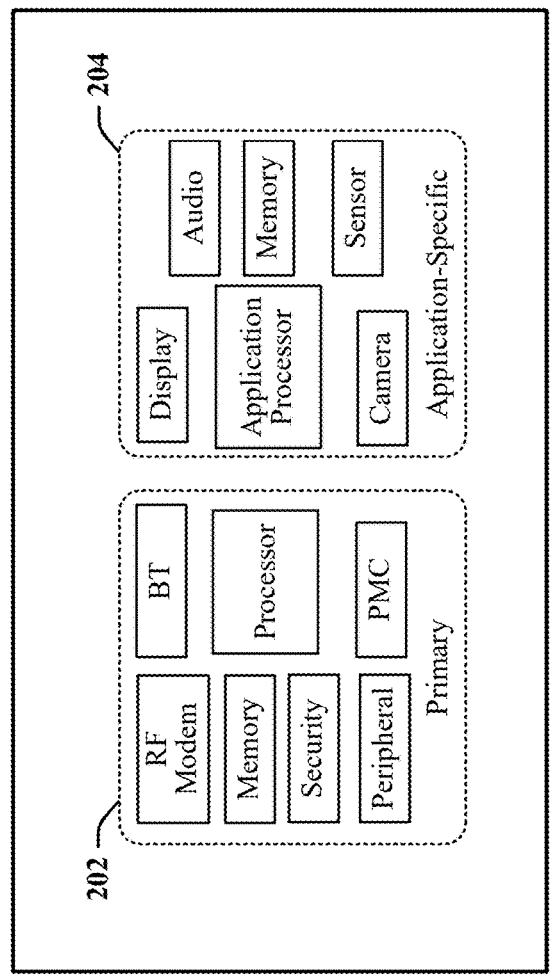
FIG. 2 illustrates certain aspects of an SoC constructed from chiplets.

The block diagram in FIG. 2 illustrates certain aspects of an SoC 200 that can be constructed using chiplets. The SoC 200 may be configured by selecting a combination of chiplets that implement certain subsystems or distinct functional elements. In the illustrated example, the SoC 200 includes a set of primary chiplets 202 that enable the SoC 200 to perform core processing, security and communication functions. The set of primary chiplets 202 include a processor, memory and one or more modems. The illustrated SoC 200 also includes a set of application-specific chiplets 204 that includes an application processor, display driver, camera interface and audio controller. In a remote sensing device or appliance, the audio-visual components could be omitted and may be replaced with analog-to-digital controllers, for example.

The SoC 200 may include a variety of processing engines, such as central processing units (CPUs) with multiple cores, graphical processing units (GPUs), digital signal processors (DSPs), neural processing units (NPUs), wireless transceiver units (also referred to as modems), peripherals, display and imaging interfaces, etc. Each of these subsystems and other functional elements can be implemented as an individual chiplet, or as a combination of chiplets. The chiplets included in the SoC 200 can be proprietary or may be acquired from a variety of sources. An SoC may be constructed from chiplets manufactured at different process nodes and/or operated at different voltages.

Figure 3:
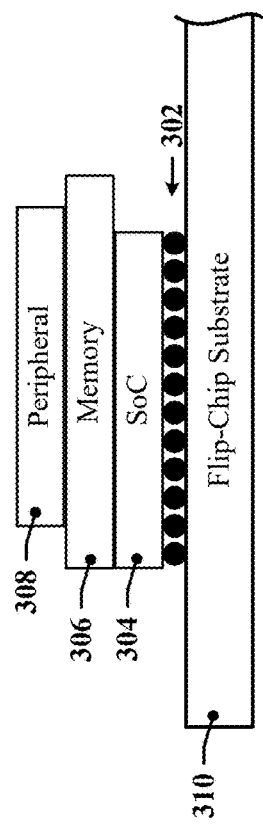
FIG. 3 illustrates an example of an SoC in which chiplets are stacked vertically on a substrate.

FIG. 3 illustrates an example of an SoC 300 in which certain chiplets 304, 306, 308 are stacked vertically on a substrate 310. Some chiplets can be included in stacks that are deployed across the surface of the substrate 310, while other chiplets may be individually mounted on the surface of the substrate. Chiplets may be mounted on the surface of the substrate using solder balls 302 that provide electrical and/or thermal coupling between substrate and the mounted chiplets. An interconnect structure may be formed that enables chiplets 304, 306, 308 in a stack of chiplets to communicate with one another, with other chiplets mounted on the substrate 310 and with input/output structures that connect the SoC 200 with other circuits, displays, imaging sensors and other peripherals with an apparatus.

The use of chiplets can reduce the areal size of the substrate 310 and increase three-dimensional packing density. The constituent chiplets may provide complex features and high performance within a smaller form-factor operated at lower power specifications. Moreover, each chiplet may define multiple power domains, operate at different frequencies and different chiplets may manage power/frequency modes independently and. In some instances, two or more chiplets may be operated in mutually exclusive power states. Additionally, operating conditions for an SoC depend on the type, number and arrangement of chiplets included on the substrate in addition to the modes of operation defined by applications. It is necessary to consider power usage by all chiplets in the SoC in order to ensure compliance with power budgets assigned for an application or device.

Conventional chiplet-based implementations suffer from limitations that include complex or difficult interconnect routing, local hotspots arising from routing congestion caused by connection architecture and challenges to signal timing specifications. In certain examples, local hotspots can arise from routing congestion, increased feature complexity and circuit concentrations. In certain examples, signal timing specifications can be compromised due to the necessity for an increased number of isolation clamps due to logic placement, number of voltage domains and reduced floorplan. Long wire crossings between chiplets can cause routing congestion and lossy interconnects.

Each chiplet in an SoC may be included to perform a specific function or type of function and the configuration of the chiplets can introduce further complexities and challenges for designers. For example, one chiplet may include radio frequency front end circuits that produce high frequency signals ranging up to 5 GHz or more, and may further include interfaces that are used by low-frequency power management circuits. A designer may import previously defined circuit blocks to implement some of the internal functions. These circuit blocks may be referred to as macros. Imported circuit blocks for a given process technology may be described, characterized or defined by a set of masks, hardware description language, specifications and test data. Commercially available or proprietary circuit blocks may be referred to as hard macros. Hard macros are tested and verified for a set of design and operating specifications. It is common for hard macros and other circuit blocks to define multiple power domains.

The Universal Chiplet Interconnect Express (UCIe) is an example of a standardized chiplet interconnect specification. The UCIe specification enables construction of large System-on-Chip (SoC) packages that in aggregate can exceed the maximum reticle size. The adoption of the UCIe specification has facilitated the integration of chiplets manufactured by different vendors into a single package. The UCIe specification enables the integration of chiplets fabricated using different silicon manufacturing processes into a single package, as required or desired for a specific device type, computing performance and/or to better meet power consumption budgets. The UCIe specification defines physical layer circuits and interconnects, protocol stacks and defines a software architecture and procedures to be used for compliance testing.

The UCIe specification defines different packaging options. One packaging option is the standard packaging option, which may also be referred to as the two-dimensional (2D) option. The standard packaging option may be applied to technology that can be used for low-cost devices and long-reach channels, where distances of between 10 mm and 25 mm may be considered to be long-reach. Another packaging option is the advanced packaging option, which may also be referred to as the 2.5D option. The advanced packaging option may be applied to technology that can be used for performance-optimized applications with short channel lengths. For example, channels that have a length that is less than 2 mm may be considered to be a short channel.

Figure 4:
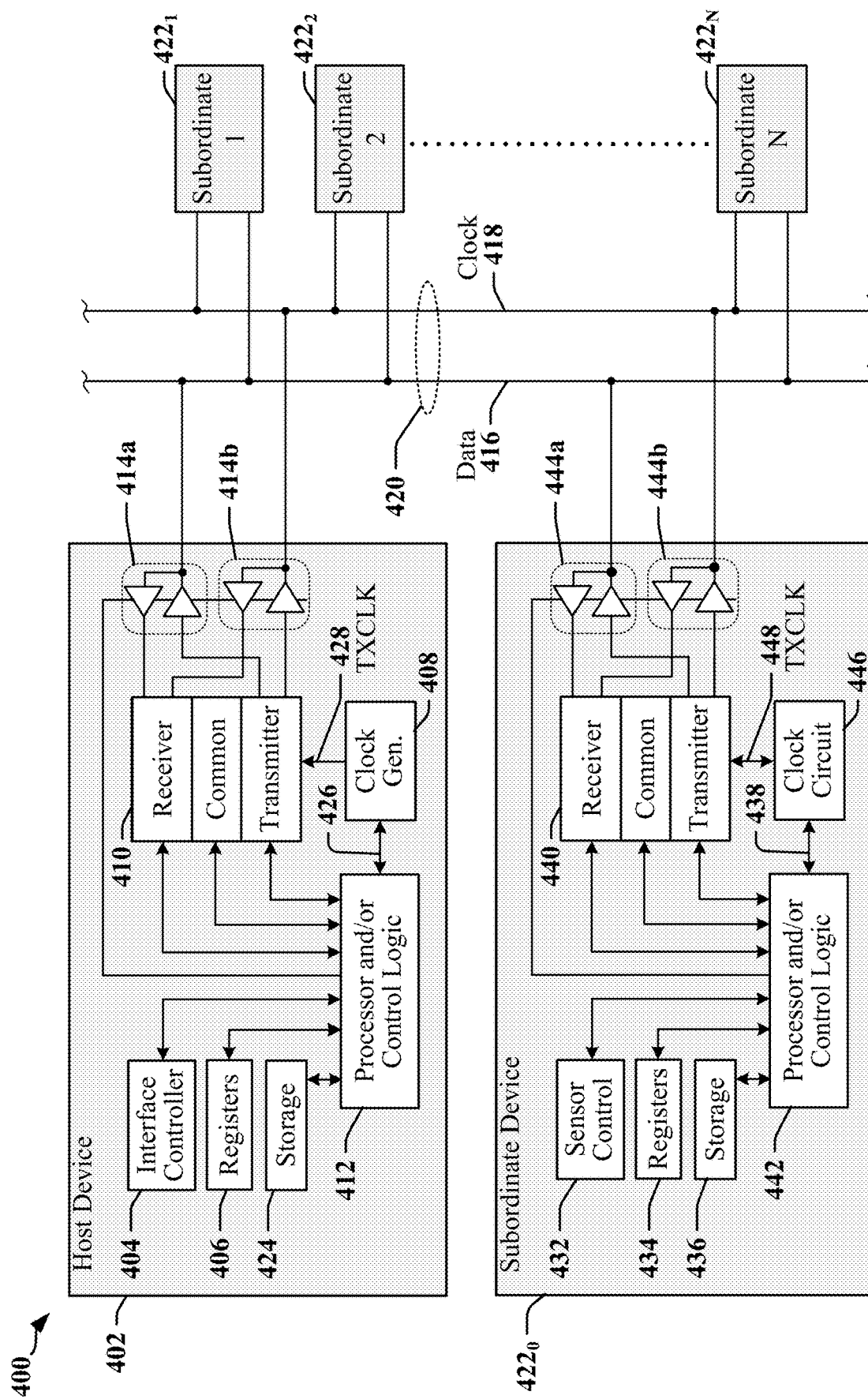
FIG. 4 illustrates certain aspects of system that includes multiple devices connected to a serial bus.

FIG. 4 illustrates certain aspects of an apparatus 400 that includes multiple devices 402, and $422_0$-$422_N$ coupled to a serial bus 420. The devices 402 and $422_0$-$422_N$ may be implemented in one or more semiconductor IC devices, such as an applications processor, SoC or ASIC. In various implementations the devices 402 and $422_0$-$422_N$ may include, support or operate as a modem, a signal processing device, a display driver, a camera, a user interface, a sensor, a sensor controller, a media player, a transceiver, and/or other such components or devices. In some examples, one or more of the subordinate devices $422_0$-$422_N$ may be used to control, manage or monitor a sensor device. Communications between devices 402 and $422_0$-$422_N$ over the serial bus 420 is controlled by a bus master device 402. Certain types of bus can support multiple bus master devices 402.

In one example, a bus master device 402 may include an interface controller 404 that can manage access to the serial bus, configure dynamic addresses for subordinate devices $422_0$-$422_N$ and/or generate a clock signal 428 to be transmitted on a clock line 418 of the serial bus 420. The bus master device 402 may include configuration registers 406 or other storage 424, and other control logic 412 configured to handle protocols and/or higher-level functions. The control logic 412 may include a processing circuit such as a state machine, sequencer, signal processor or general-purpose processor. The illustrated bus master device 402 includes a transceiver 410 and line drivers/receivers 414a and 414b. The transceiver 410 may include receiver, transmitter and common circuits, where the common circuits may include timing, logic and storage circuits and/or devices. In one example, the transmitter encodes and transmits data based on timing in the clock signal 428 provided by a clock generation circuit 408. Other timing clocks 426 may be used by the control logic 412 and other functions, circuits or modules.

At least one device $422_0$-$422_N$ may be configured to operate as a subordinate device on the serial bus 420 and may include circuits and modules that support a display, an image sensor, and/or circuits and modules that control and communicate with one or more sensors that measure environmental conditions. In one example, a subordinate device $422_0$ configured to operate as a subordinate device may provide a control function, module or circuit 432 that includes circuits and modules to support a display, an image sensor, and/or circuits and modules that control and communicate with one or more sensors that measure environmental conditions. The subordinate device $422_0$ may include configuration registers 434 or other storage 436, control logic 442, a transceiver 440 and line drivers/receivers 444a and 444b. The control logic 442 may include a processing circuit such as a state machine, sequencer, signal processor or general-purpose processor. The transceiver 410 may include receiver, transmitter and common circuits, where the common circuits may include timing, logic and storage circuits and/or devices. In one example, the transmitter encodes and transmits data based on timing in a clock signal 448 provided by clock generation and/or recovery circuits 446. The clock signal 448 may be derived from a signal received from the clock line 418. Other timing clocks 438 may be used by the control logic 442 and other functions, circuits or modules.

The serial bus 420 may be operated in accordance with Inter-Integrated Circuit (I2C or I²C) protocols, Improved Inter-Integrated Circuit (I3C) protocols, Radio Frequency Front-End (RFFE) protocols, system power management interface (SPMI) protocols, serial peripheral interface (SPI) protocols, or other protocols. At least one device 402, $422_0$-$422_N$ may be configured to operate as both a bus master device and a subordinate device on the serial bus 420. Two or more devices 402, $422_0$-$422_N$ may be configured to operate as a bus master device on the serial bus 420.

In some implementations, the serial bus 420 may be operated in accordance with an I3C protocol. Devices that communicate using the I3C protocol can coexist on the same serial bus 420 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 4.2 Mbps. I2C and I3C protocols may define electrical and timing aspects for signals transmitted on the 2-wire serial bus 420, in addition to data formats and aspects of bus control. In some aspects, the I2C and I3C protocols may define direct current (DC) characteristics affecting certain signal levels associated with the serial bus 420, and/or alternating current (AC) characteristics affecting certain timing aspects of signals transmitted on the serial bus 420. In some examples, a 2-wire serial bus 420 transmits data on a data line 416 and a clock signal on the clock line 418. In some instances, data may be encoded in the signaling state, or transitions in signaling state of the data line 416 and the clock line 418.

Figure 5:
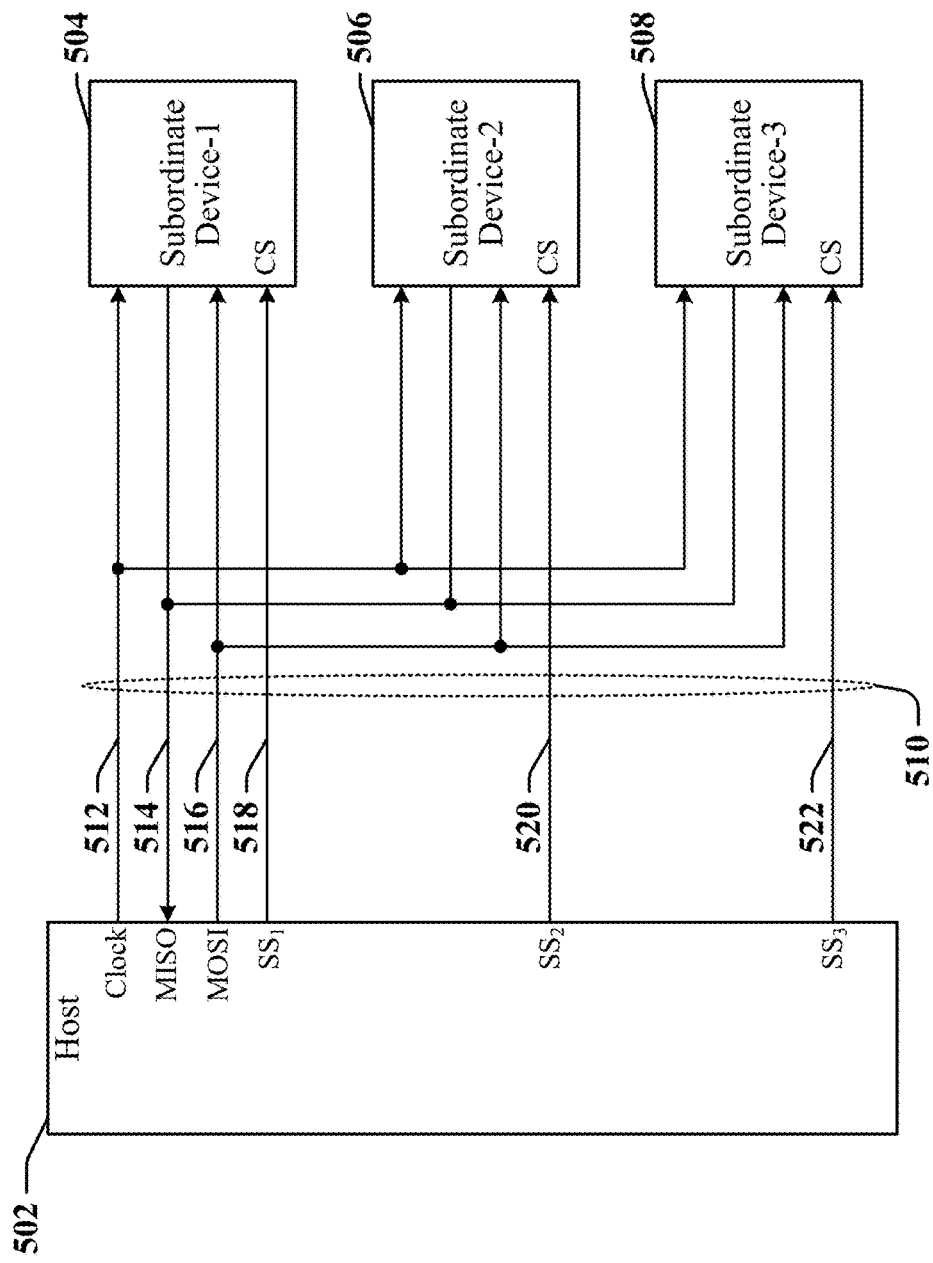
FIG. 5 illustrates certain aspects of a 2-dataline serial peripheral interface that may be adapted according to certain aspects disclosed herein.

In accordance with certain aspects of this disclosure, a serial bus operated in accordance with serial peripheral interface (SPI) protocols can be used to provide a simple, low-power communication interface. In one example, the SPI interface may be used primarily to exchange data between a processing circuit and a touch panel of a display. An SPI interface may be coupled to a serial bus that has a clock wire, two data lines (Master In Slave Out (MISO) line, Master Out Slave In (MOSI) line) and a Chip Select (CS) for each subordinate device. The presence of MISO and MOSI lines enables full-duplex operation. FIG. 5 illustrates certain aspects related to the operation a two data line SPI 500. In some instances, a master device 502 may be incorporated in an SoC that serves as an application processor, host processor, or other functional component of an apparatus or system. The master device 502 is coupled to multiple subordinate devices 504, 506, 508 using a multi-wire bus 510. The master device 502 drives data to the subordinate devices 504, 506, 508 over a master-out-slave-in line (MOSI line 516) of the multi-wire bus 510. The subordinate devices 504, 506, 508 may each drive data to the master device 502 over a shared master-in-slave-out line (MISO line 514) of the multi-wire bus 510.

The multi-wire bus 510 includes at least one slave select line 518, 520, 522 for each subordinate device 504, 506, 508. As illustrated, a first slave select line 518 (SS1) controls bus access by the first subordinate device 504, a second slave select line 520 (SS2) controls bus access by the second subordinate device 506, and a third slave select line 522 (SS3) controls bus access by the third subordinate device 504. The master device 502 may assert a slave select line 518, 520, 522 to cause a corresponding subordinate device 504, 506, 508 to receive data over the MOSI line 516, and/or to grant permission to the corresponding subordinate device 504, 506, 508 to transmit on the MISO line 514.

In one example, the slave select lines 518, 520, 522 are not asserted when a low voltage level is applied to the slave select lines 518, 520, 522, and a slave select line 518, 520, 522 is asserted by driving the slave select line 518, 520, 522 to a high voltage level (e.g., towards the power supply level). In another example, the slave select lines 518, 520, 522 are not asserted when a high voltage level (e.g., the power supply level) is applied to the slave select lines 518, 520, 522, and a slave select line 518, 520, 522 is asserted by driving the slave select line 518, 520, 522 to a low voltage level. For each slave select line 518, 520, 522, a driver in the master device 502 may be operated to charge and discharge the slave select line 518, 520, 522 based on assertion state desired for the slave select line 518, 520, 522.

Data is transmitted between the master device 502 and a subordinate device 504, 506, 508 in accordance with a clock signal provided on a clock line 512 of the multi-wire bus 510. Data signaling is unidirectional on the MISO line 514 and on the MOSI line 516. Data is transferred over the MISO line 514 in a direction opposite to that of data transferred over the MOSI line 516. Data transfers over the MISO line 514 and MOSI line 516 are synchronized to the clock signal provided on the clock line 512.

Figure 6:
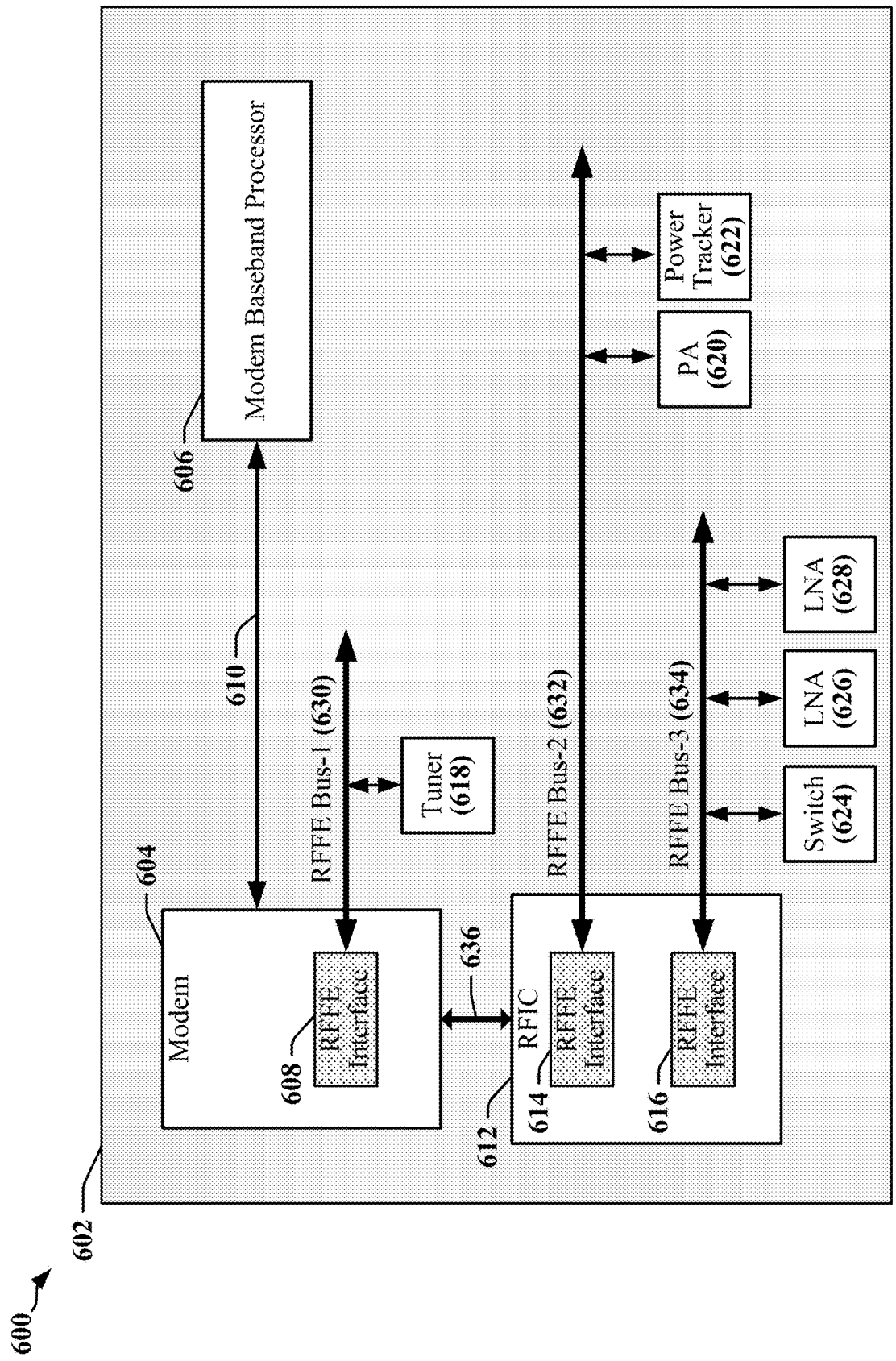
FIG. 6 illustrates a device configuration for coupling various radio frequency front-end devices using multiple RFFE buses.

FIG. 6 is a diagram 600 illustrating an example of a configuration of communication links in a chipset or device 602 that employs multiple RFFE buses 630, 632, 634 to couple various RF front-end devices 618, 620, 622, 624, 626 628. In this example, a modem 604 includes an RFFE interface 608 that couples the modem 604 to a first RFFE bus 630. The modem 604 may communicate with a baseband processor 606 and a Radio-Frequency IC (RFIC 612) through respective communication links 610, 636 or, in some implementations, through a common communication link 610 or 636. The illustrated device 602 may be embodied in one or more of a mobile communication device, a mobile telephone, a mobile computing system, a mobile telephone, a notebook computer, a tablet computing device, a media player, a gaming device, a wearable computing device, a wearable communication device, an appliance, or the like.

In various examples, the chipset or device 602 may be implemented with one or more baseband processors 606, modems 604, RFICs 612, multiple communication links 610, 636, multiple RFFE buses 630, 632, 634 and/or other types of buses. Each of the RFFE buses 630, 632, 634 is managed by a bus owner master (BoM) device. In the example illustrated in FIG. 6, the modem 604 and the RFIC 612 may be designated as BoM for one or more of the RFFE buses 630, 632, 634. The chipset or device 602 may include other processors, circuits, modules and may be configured for various operations and/or different functionalities.

In the example illustrated in FIG. 6, the modem 604 is coupled to an RF tuner 618 through its RFFE interface 608 and the first RFFE bus 630. The RFIC 612 may include one or more RFFE interfaces 614, 616, controllers, state machines and/or processors that configure and control certain aspects of the RF front-end. In the illustrated example, the RFIC 612 communicates with a PA 620 and a power tracking module 622 through a first of its RFFE interfaces 614 and the second RFFE bus 632. In the illustrated example, RFIC 612 communicates with a switch 624 and one or more LNAs 626, 628 through a second of its RFFE interfaces 616 and the third RFFE bus 634.

Bus latency can affect the ability of a serial bus to handle high-priority, real-time and/or other time-constrained messages. Low-latency messages, or messages requiring low bus latency, may relate to sensor status, device-generated real-time events and virtualized GPIO. In one example, bus latency can be measured as the time elapsed between a message becoming available for transmission and the delivery of the message. In another example, bus latency can be measured as the time elapsed between a message becoming available for transmission and commencement of transmission of the message. Other measures of bus latency may be employed. Bus latency typically includes delays incurred while higher priority messages are transmitted, interrupt processing, the time required to terminate a datagram in process on the serial bus, the time to transmit commands causing bus turnaround between transmit mode and receive mode, bus arbitration and/or command transmissions specified by protocol.

In one example, latency-sensitive messages carry or include coexistence messages. Coexistence messages may be transmitted in a multisystem platform to prevent or reduce instances of certain types of RFFE device impinging on each other. RFFE devices that may be the source or subject of coexistence messages include, for example, switches 624, LNAs 626, 628, PAs 620 and other types of device that operate concurrently in a manner that generates inter-device RF interference, and/or that could potentially cause damage to one or more devices. Coexistence management messages may be exchanged between certain devices that are shared between different radio access technologies, wireless subscriptions and/or applications. For example, a switch 624, LNA 626, 628, PA 620 and/or an antenna may be shared by two different radio access technologies which have different transmit and receive schedules, and damage to an LNA 626, 628 or other device may occur if a device begins transmitting using one radio access technology while receiving using another radio access technology. Devices that can interfere with one another may exchange coexistence management (CxM) messages to permit each device to signal imminent actions that may result in interference or conflict. For example, two modems 604 may exchange CxM messages in order to manage the operation of shared components.

In accordance with certain aspects disclosed herein, a two-wire serial bus may be adapted to operate alternately in a conventional two-wire mode and for a one-wire mode. In one example, the serial bus may be operated according to RFFE protocols such that the clock and data line are used for communication with two-wire subordinate devices coupled to the serial bus and the data line is used without a clock signal for communication with one-wire subordinate devices coupled to the serial bus. The host device may use pulse-width modulation to encode data transmitted to one-wire subordinate devices.

An SoC may employ a combination of high speed and low speed standardized or proprietary bus architectures for interconnecting devices and subcircuits with the SoC. In one example, an SoC implemented using multiple chiplets mounted on a common chip carrier may be coupled through high-speed data communication buses operated according Universal Chiplet Interconnect Express (UCIe). In another example, an SoC may include one or more data communication buses that are operated in accordance with Advanced High-Performance Bus (AHB) protocols defined by Advanced Microcontroller Bus Architecture (AMBA) specifications. In another example, low-speed data communication buses that are operated in accordance with CAN, Ethernet, RFFE, I2C, I3C, SPMI or SPI protocols may be used to connect peripheral devices to the SoC. Other bus architectures or protocols may be employed to satisfy design or application requirements. Certain bus architectures may be deployed to support inter-processor communications, inter-device communications, sensor support, high-speed communication and/or memory interfaces.

Low-speed bus interfaces are commonly used to interact with peripherals outside of a SoC. Low-speed buses can be used to provide communication links between for secure and insecure (non-secure) entities. Examples of a secure entity include functions or applications executed within or on behalf of a trusted execution zone, encryption and e-commerce applications, for example. A trusted execution zone may include processors, applications, memory, peripherals, communication, interfaces and may be implemented as a hardware enforced set of secured resources in system from which access by non-secured applications and peripherals are blocked. Communication between secured entities such as between processors and peripherals is typically required to be provided over a dedicated communication link. A majority of operations involving secured entities endure for a short period of time. For example, short-lived operations may involve authentication, cryptography and biometric verification. The requirement for a dedicated communication link can impose a significant burden on efficiency of resource allocation such as input/output (I/O) circuits, general purpose I/O (GPIO) pins and interconnects between chips and serial engines that include serializer/deserializer (SERDES) circuits and associated drivers, receivers, clock generators and data capture circuits.

Certain aspects of this disclosure describe apparatus, methods, techniques and schemes by which a serial bus can be shared between secured and non-secured applications. In one aspect, access control logic may be implemented in a bus controller that manages access to serial bus interfaces and/or GPIO used to interconnect serial bus interfaces in different devices.

Figure 7:
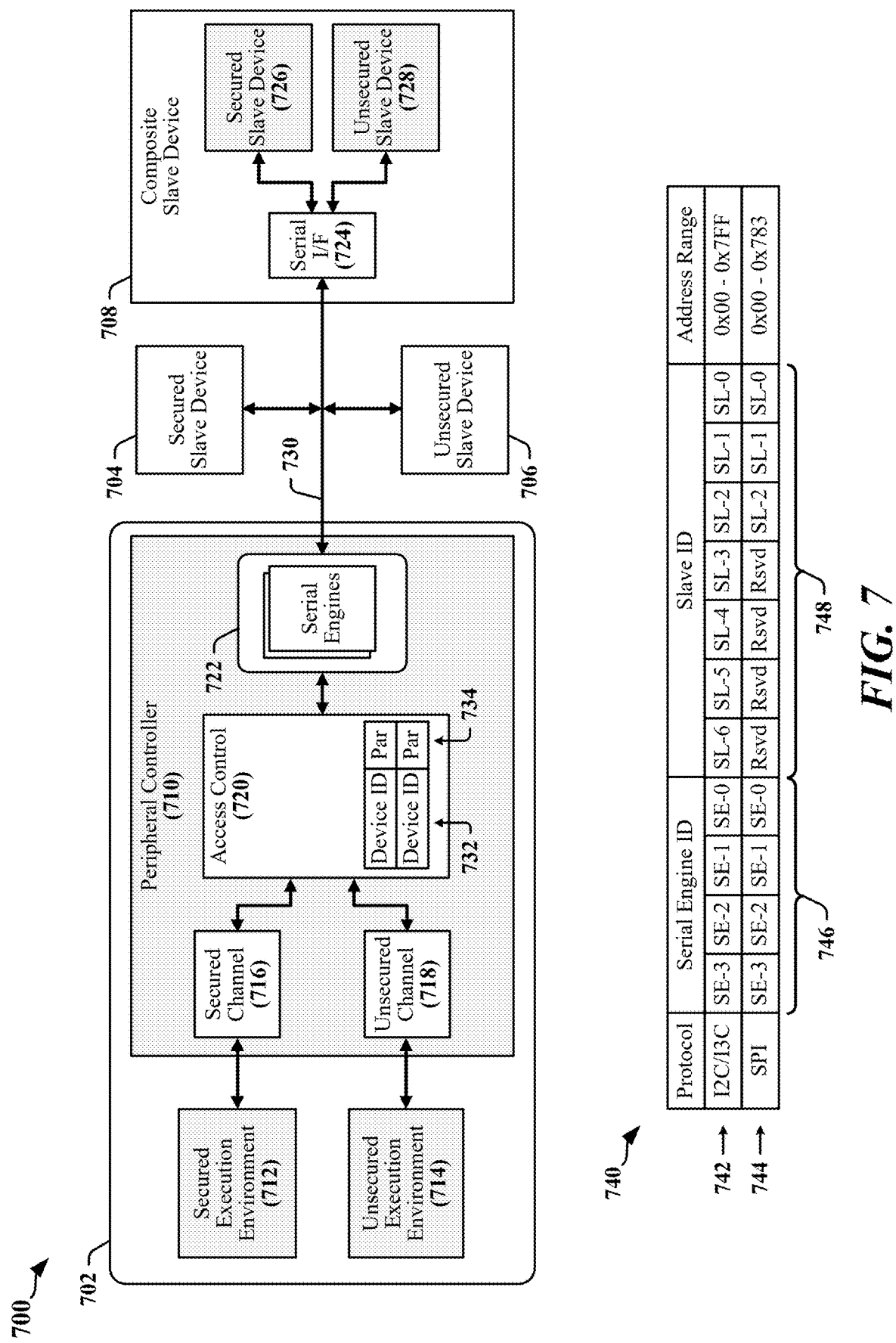
FIG. 7 illustrates a system configured to share a serial communication link between secured slave devices and unsecured slave devices in accordance with certain aspects of this disclosure.

FIG. 7 illustrates an example of a system 700 that may be configured to share a serial communication link 730 between secured slave devices 704, 726 and unsecured slave devices 706, 728 in accordance with certain aspects of this disclosure. The system 700 includes an SoC 702, peripheral slave devices 704, 706 and a composite slave device 708 coupled through the serial communication link 730. The composite slave device 708 includes two slave devices 726, 728 that are coupled to the serial communication link 730 through a shared serial bus interface (the Serial I/F 724). In one example, the slave devices 726, 728 may be operated in accordance with an I2C, I3C, SPI or RFFE protocol and each of the slave devices 726, 728 may be assigned different unique identifiers to be used when communicating over the serial communication link 730. In the illustrated example, one slave device 704 is configured to operate as a secured device, 726 and another slave device 706 is configured to operate as an unsecured device.

The SoC 702 further includes a peripheral controller 710 that implements and manages the interface that couples low-speed peripherals to the SoC 702. The peripheral controller may be used by one or more subsystems of the SoC 702 to configure, initiate and manage communication links with external peripherals. The subsystems may define one or more execution environments. In the illustrated example, the subsystems define a secured execution environment 712 and an unsecured execution environment 714. In operation, the secured execution environment 712 may establish a secured communication channel 716 with the peripheral controller 710 and with the expectation that the peripheral controller 710 will establish a dedicated communication link on its behalf with a secured slave device 704 or 726 as indicated by a context established within the peripheral controller 710 for the secured execution environment 712. The unsecured execution environment 714 may establish an unsecured communication channel 718 with the peripheral controller 710. In some implementations, the peripheral controller 710 may establish a communication link with one or more unsecured slave devices 704 and/or 726 on behalf of the unsecured execution environment 712 using a shared or dedicated serial bus.

In the illustrated example, the SoC 702 includes serial engines 722 that can be used to initiate and control communication through one or more communication links. Each serial engine may include drivers and receivers that can be configured to operate a communication link in accordance with a protocol selected for the communication link. Each serial engine may further include a controller that is configured to manage the flow data and commands over the communication link, to initiate transactions, detect errors and generate control sequences and patterns defined by the select link protocol. Each serial engine may further include SERDES circuits and clock generators and data capture circuits that can be used to process data transmitted or received over the communication link. For example, one of the serial engines 722 may be configured to manage a communication link operated in accordance with SPI protocols and may generate chip select lines that can be used to select slave device that is to participate in a transaction. receiving device. In another example, one of the serial engines 722 may be configured to manage a communication link operated in accordance with I2C or I3C protocols, in which control commands and addressing is handled in-band, using signaling on the two wires of the I2C or I3C bus.

The SoC 702 further includes an access control circuit or module 720 that can be used to apply access control policy and to manage secured and unsecured communication. The access control circuit or module 720 may be configured to validate device addresses and commands directed to a secured execution environment 712 or to a secured slave device 704, 726. In one example, access control may be managed based on an extended device identifier (ID) associated with a peripheral. The access control circuit or module 720 may apply access policy based on a listing of device IDs 732 and certain access policy parameters 734. The access policy parameters may determine whether an identified peripheral is assigned to a secured execution environment 712, the type of commands or individual commands that can be transmitted to the identified peripheral, among other parameters. The device ID may identify a peripheral device and one of the serial engines 722 to be used to communicate with the peripheral device. The table 740 provided in FIG. 7 provides examples of device identifier formats 742, 744. A first device identifier format 742 may be used to access peripheral using I2C or I3C protocols. The first device identifier format 742 defines a 4-bit serial engine ID field 746 and a 7-bit slave ID field 748. In one example, the 7-bit slave ID field 748 is populated by the unique slave ID assigned according to I2C or I3C protocols. The second device identifier format 744 may be applicable for SPI operations using a serial engine identified by the 4-bit serial engine ID field 746. In one example, 3 bits of the slave ID field 748 are used to indicate a slave select line to be asserted for communication using SPI protocols. In both device identifier formats 742, 744, the serial engine ID field 746 can be used to identify and reserve one or more of the serial engines 722 for handling secured communication channels.

Figure 8:
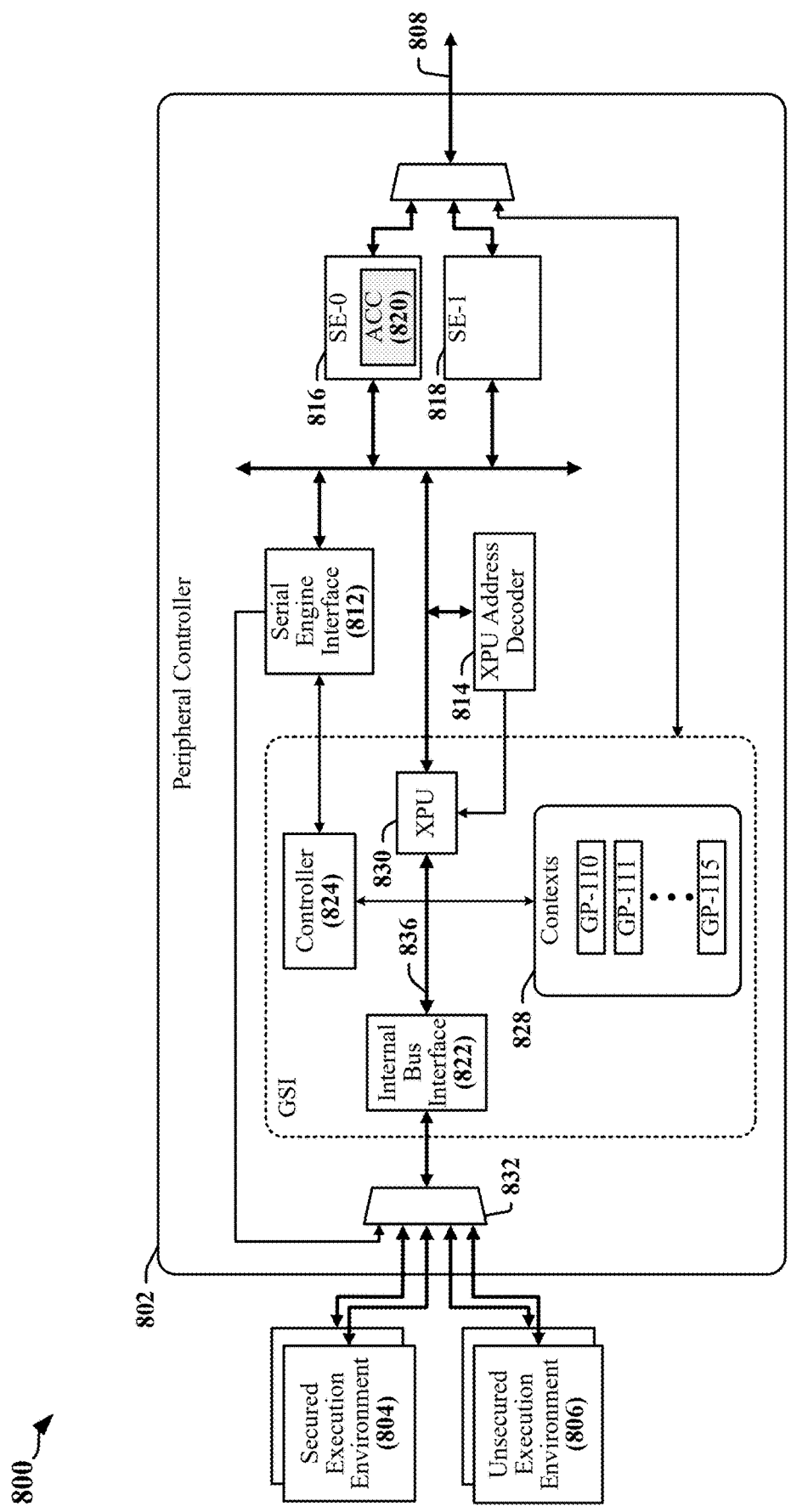
FIG. 8 illustrates a first example of access control in a system configured in accordance with certain aspects of this disclosure.

FIG. 8 illustrates a first example of an implementation of access control in a system 800 that may be configured in accordance with certain aspects of this disclosure. In this example, an access control circuit (the ACC 820) is provided in a secured serial engine 816 of a peripheral controller 802. The ACC 820 can be configured to implement, manage and/or enforce access policies for a dedicated communication link established through a secured serial engine 816. The ACC 820 may be configured to decode and recognize commands and/or data to be transmitted to a secured peripheral (not shown). The ACC 820 in the secured serial engine 816 may be configured to enforce access policies based on a combination of device ID 732 and access policy parameters 734 (see FIG. 7). The ACC 820 may enforce access control based on the identity of a requesting execution environment and the dedicated communication link to be used to exchange data or commands. In one example, the requesting execution environment may be the originator of a transaction involving one or more secured slave devices.

An XPU 830 may be used to establish, configure and implement multi-process contexts 828 in the peripheral controller 802 that correspond to, or that are controlled by execution environments 804, 806. The XPU 830 may be used to allocate and manage the resources needed by each execution environment supported by the system 800. In the illustrated example, a secured execution environment 804 may require a dedicated communication link 808 when communicating with an external peripheral. In one example, the establishment of, or transmission over a dedicated communication link 808 may be initiated by a controller 824 responsive to the context 828 associated with the secured execution environment 804. The controller 824 may communicate with a serial interface engine 812 that configures the serial engines 816, 818. The serial interface engine 812 may be configured by the controller 824 to format or structure transactions in accordance with the protocols used to manage operations of the dedicated communication link 808. The serial interface engine 812 may configure the secured serial engine 816 through a high-speed bus 836. The high-speed bus 836 may be further used to exchange data associated with through the secured serial engine 816.

The high-speed bus 836 may be accessed through a context multiplexer 832 controlled by the XPU 830 and a bus interface circuit 822. The context multiplexer 832 may select between the output of the serial interface engine 812 and inputs received from multiple execution environments 804, 806. In some instances, one or more of the execution environments 804, 806 may be provided with direct access to the unsecured serial engine 818. For example, a modem may have direct access to the unsecured serial engine 818. The modem may be provided direct access to the serial engine 818 to enable latency-sensitive coexistence messages to be efficiently transmitted to multiple RFFE devices. The output of the serial interface engine 812 may provide a secured channel for one or more of the execution environments 804, 806. The XPU 830 may configure a current context based on addresses of transmitters or receivers located in one of the execution environments 804, 806 or addresses of slave devices in external peripherals. The XPU 830 may include or be coupled to an XPU address decoder 814. In some implementations, an XPU may be implemented in the secured serial engine 816.

The ACC 820 may examine slave ID and the identity of the requesting execution environment for every requested transfer or transaction over a secured channel is configured using a shared serial bus. The ACC 820 may examine other relevant attributes when authorizing a requested transfer or transaction over the secured channel. According to one aspect, certain registers defining the access control policy may be locked such that commands received over the shared serial bus cannot modify the access control policy. Locking the registers that define the access control policy can prevent unauthorized accesses by a rogue slave device or malicious agent.

Figure 9:
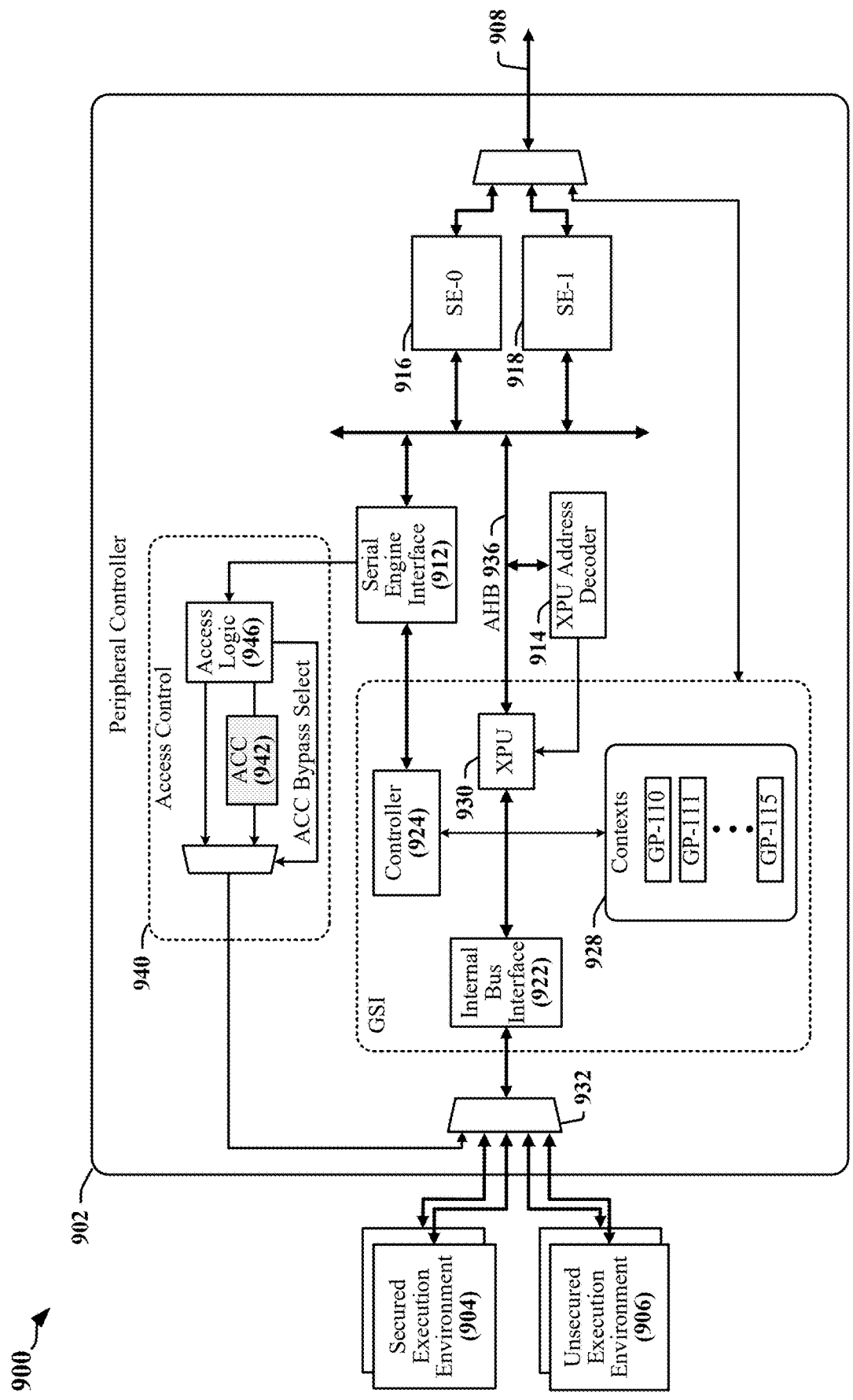
FIG. 9 illustrates a second example of access control in a system configured in accordance with certain aspects of this disclosure.

FIG. 9 illustrates a second example of an implementation of access control in a system 700 that may be configured in accordance with certain aspects of this disclosure. In this example, an access control circuit (the ACC 942) is provided within an access control subsystem 940 of a peripheral controller 902. The ACC 942 may be configured to implement, manage and/or enforce access policies for a dedicated communication link established through a serial engine 916. The ACC 942 may include a controller or combinational logic 946 configured to decode and recognize commands and/or data to be transmitted to a secured peripheral (not shown). The ACC 942 may be configured to enforce access policies based on a combination of device ID 732 and access policy parameters 734 (see FIG. 7). The ACC 942 may enforce access control based on the identity of a requesting execution environment and the dedicated communication link to be used to exchange data or commands. In one example, the requesting execution environment may be the originator of a transaction involving one or more secured slave devices.

An XPU 930 may be used to establish, configure and implement multi-process contexts 928 in the peripheral controller 902 that correspond to, or that are controlled by execution environments 904, 906. The XPU 930 may be used to allocate and manage the resources needed by each execution environment supported by the system 900. In the illustrated example, a secured execution environment 904 may require a dedicated communication link 908 when communicating with an external peripheral. In one example, the establishment of, or transmission over a dedicated communication link 908 may be initiated by a controller 924 responsive to the context 928 associated with the secured execution environment 904. The controller 924 may communicate with a serial interface engine 912 that configures the serial engines 916, 918. The serial interface engine 912 may be configured by the controller 924 to format or structure transactions in accordance with the protocols used to manage operations of the dedicated communication link 908. The serial interface engine 912 may provide the transactions to a selected serial engine 916 through a high-speed bus 936.

The high-speed bus 936 may be accessed through a context multiplexer 932 controlled by the XPU 930 and a bus interface circuit 922. The context multiplexer 932 may select between the output of the serial interface engine 912 and inputs received from multiple execution environments 904, 906. In some instances, one or more of the execution environments 904, 906 may be provided with direct access to another serial engine 918. For example, a modem may have direct access to the other serial engine 918. The modem may be provided direct access to the serial engine 918 to enable latency-sensitive coexistence messages to be efficiently transmitted to multiple RFFE devices. The output of the serial interface engine 912 may provide a secured channel for one or more of the execution environments 904, 906. The XPU 930 may configure a current context based on addresses of transmitters or receivers located in an execution environments 904, 906 or addresses of slave devices in external peripherals. The XPU 930 may include or be coupled to an XPU address decoder 914.

The ACC 942 may examine slave ID and the identity of the requesting execution environment for every requested transfer or transaction over a secured channel is configured using a shared serial bus. The ACC 942 may examine other relevant attributes when authorizing a requested transfer or transaction over the secured channel. According to one aspect, certain registers defining the access control policy may be locked such that commands received over the shared serial bus cannot modify the access control policy. Locking the registers that define the access control policy can prevent unauthorized accesses by a rogue slave device or malicious agent.

Figure 10:
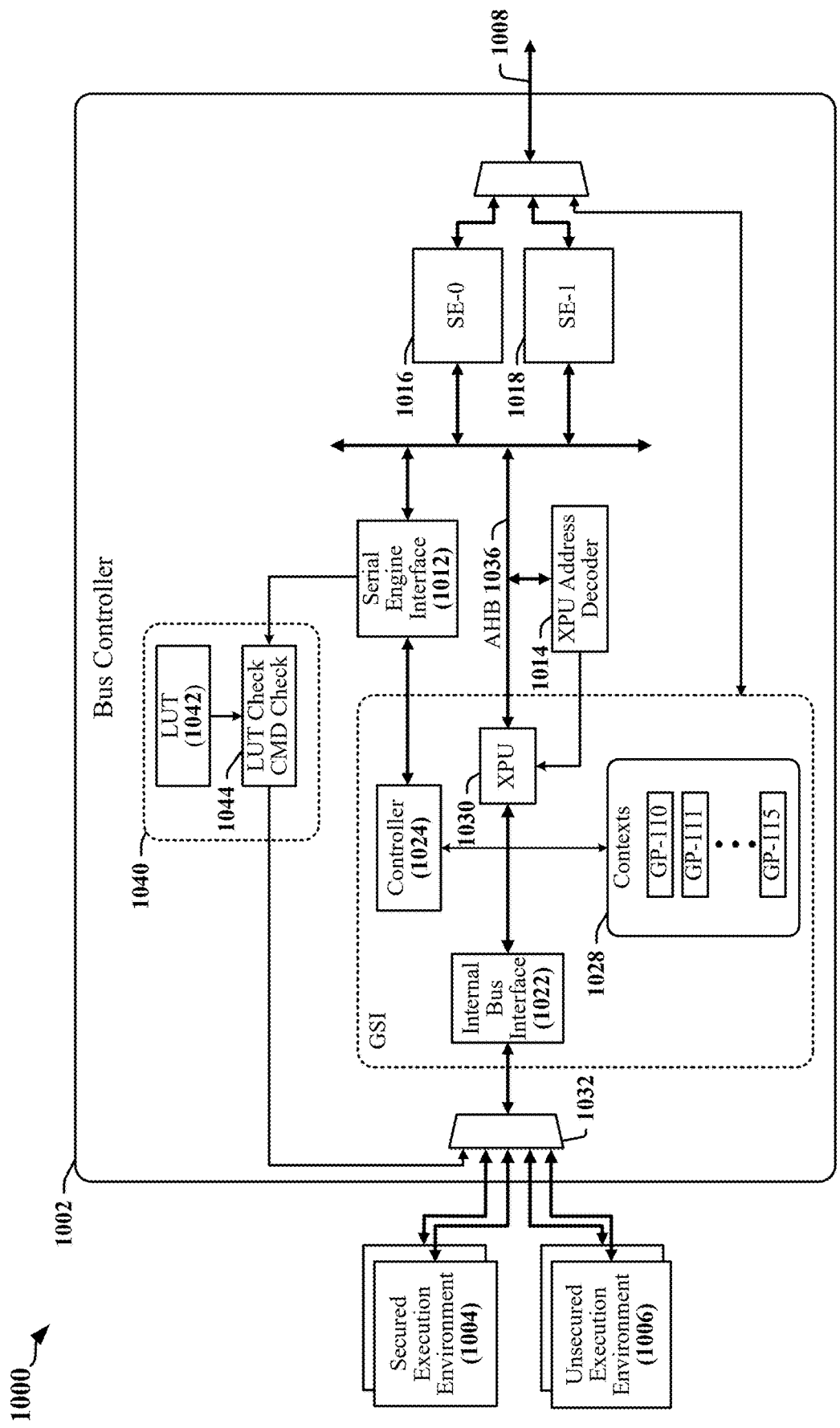
FIG. 10 illustrates a third example of access control in a system configured in accordance with certain aspects of this disclosure.

FIG. 10 illustrates a third example of implementation of access control in a system 700 that may be configured in accordance with certain aspects of this disclosure. In this example, access control is enforced using a lookup table circuit or module 1044 provided within an access control subsystem 1040 of a peripheral controller 1002. The lookup table circuit or module 1044 includes or can access one or more lookup tables (e.g., the LUT 1042). The LUT 1042 may identify aspects of the access policy that relate to a command in a transaction directed to a serial engine 1016, to a device ID, to the serial engine 1016 and/or to a secured execution environment 1004 involved in the transaction. A controller or combinational logic may be configured to enforce access policies for a dedicated communication link established through a serial engine 1016 by validating transmissions based on slave ID and command codes. The lookup table circuit or module 1044 may be configured to decode and recognize commands and/or data to be transmitted to a secured peripheral (not shown). In some implementations, the lookup table circuit or module 1044 may be configured to enforce access policies based on a combination of device ID 732 and access policy parameters 734 (see FIG. 7). The lookup table circuit or module 1044 may enforce access control based on the identity of a requesting execution environment and the dedicated communication link to be used to exchange data or commands. In one example, the requesting execution environment may be the originator of a transaction involving one or more secured slave devices.

An XPU 1030 may be used to establish, configure and implement multi-process contexts 1028 in the peripheral controller 1002 that correspond to, or that are controlled by execution environments 1004, 1006. The XPU 1030 may be used to allocate and manage the resources needed by each execution environment supported by the system 1000. In the illustrated example, a secured execution environment 1004 may require a dedicated communication link 1008 when communicating with an external peripheral. In one example, the establishment of, or transmission over a dedicated communication link 1008 may be initiated by a controller 1024 responsive to the context 1028 associated with the secured execution environment 1004. The controller 1024 may communicate with a serial interface engine 1012 that configures the serial engines 1016, 1018. The serial interface engine 1012 may be configured by the controller 1024 to format or structure transactions in accordance with the protocols used to manage operations of the dedicated communication link 1008. The serial interface engine 1012 may provide the transactions to a selected serial engine 1016 through a high-speed bus 1036.

The high-speed bus 1036 may be accessed through a context multiplexer 1032 controlled by the XPU 1030 and a bus interface circuit 1022. The context multiplexer 1032 may select between the output of the serial interface engine 1012 and inputs received from multiple execution environments 1004, 1006. In some instances, one or more of the execution environments 1004, 1006 may be provided with direct access to another serial engine 1018. For example, a modem may have direct access to the other serial engine 1018. The modem may be provided direct access to the serial engine 1018 to enable latency-sensitive coexistence messages to be efficiently transmitted to multiple RFFE devices. The output of the serial interface engine 1012 may provide a secured channel for one or more of the execution environments 1004, 1006. The XPU 1030 may configure a current context based on addresses of transmitters or receivers located in an execution environments 1004, 1006 or addresses of slave devices in external peripherals. The XPU 1030 may include or be coupled to an XPU address decoder 1014.

The lookup table circuit or module 1044 may be used by a controller to examine slave ID and the identity of the requesting execution environment for every requested transfer or transaction over a secured channel is configured using a shared serial bus. Other relevant attributes may be examined when authorizing a requested transfer or transaction over the secured channel. According to one aspect, the lookup table 1042 and/or certain registers defining the access control policy may be locked such that commands received over the shared serial bus cannot modify the access control policy. Locking the lookup table 1042 and/or the registers that define the access control policy can prevent unauthorized accesses by a rogue slave device or malicious agent.

Figure 11:
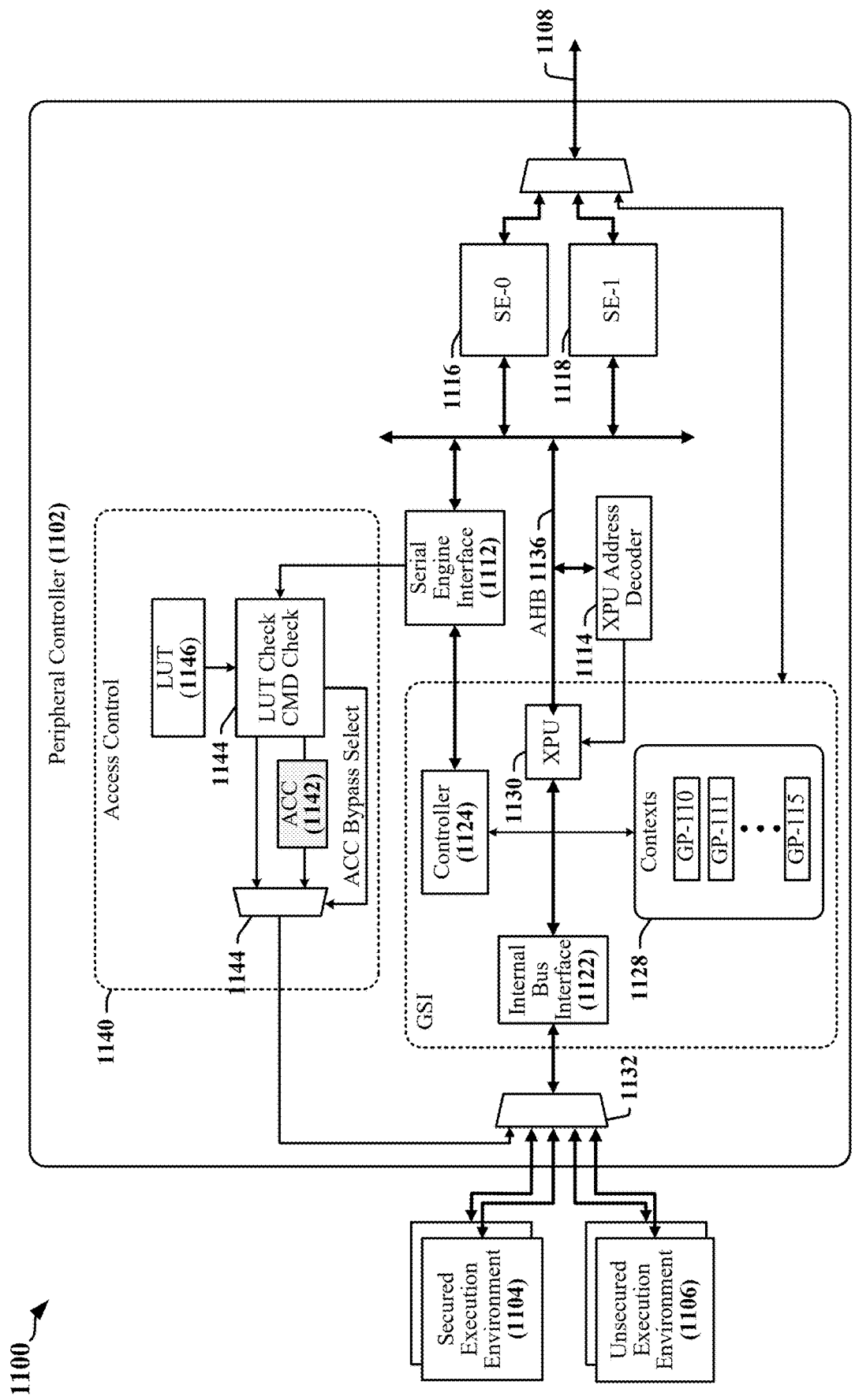
FIG. 11 illustrates a fourth example of access control in a system configured in accordance with certain aspects of this disclosure.

FIG. 11 illustrates a fourth example of implementation of access control in a system 700 that may be configured in accordance with certain aspects of this disclosure. In this example, an access control circuit (the ACC 1142) is provided within an access control subsystem 1140 of a peripheral controller 1102. The ACC 1142 may be configured to implement, manage and/or enforce access policies for a dedicated communication link established through a serial engine 1116. The ACC 1142 may be configured to decode and recognize commands and/or data to be transmitted to a secured peripheral (not shown). The ACC 1142 may be configured to enforce access policies based on a combination of device ID 732 and access policy parameters 734 (see FIG. 7). The ACC 1142 may enforce access control based on the identity of a requesting execution environment and the dedicated communication link to be used to exchange data or commands. In one example, the requesting execution environment may be the originator of a transaction involving one or more secured slave devices.

The ACC 1142 includes a lookup table circuit or module 1144 that includes or accesses one or more lookup tables (e.g., LUT 1146). The LUT 1146 may identify aspects of the access policy that relate to a command in a transaction directed to a serial engine 1116, to a device ID, to the serial engine 1116 and/or to a secured execution environment 1104 involved in the transaction. A lookup table circuit or module 1144 may be configured to enforce access policies for a dedicated communication link established through a serial engine 1116 using a "whitelist" to validate transmissions based on slave ID and command codes. The whitelist may indicate authorized slave IDs and command codes for a dedicated communication link 1108. The lookup table circuit or module 1144 may be configured to decode and recognize valid commands and/or data to be transmitted to a secured peripheral (not shown). In some implementations, the lookup table circuit or module 1044 may be configured to enable validated transmissions to bypass the ACC 1142. The lookup table circuit or module 1044 may be used enforce access control directed to a slave ID based on the identity of a requesting execution environment and the dedicated communication link to be used to exchange data or commands. In one example, the requesting execution environment may be the originator of a transaction involving one or more secured slave devices.

An XPU 1130 may be used to establish, configure and implement multi-process contexts 1128 in the peripheral controller 1102 that correspond to, or that are controlled by execution environments 1104, 1106. The XPU 1130 may be used to allocate and manage the resources needed by each execution environment supported by the system 1100. In the illustrated example, a secured execution environment 1104 may require a dedicated communication link 1108 when communicating with an external peripheral. In one example, the establishment of, or transmission over a dedicated communication link 1108 may be initiated by a controller 1124 responsive to the context 1128 associated with the secured execution environment 1104. The controller 1124 may communicate with a serial interface engine 1112 that configures the serial engines 1116, 1118. The serial interface engine 1112 may be configured by the controller 1124 to format or structure transactions in accordance with the protocols used to manage operations of the dedicated communication link 1108. The serial interface engine 1112 may provide the transactions to a selected serial engine 1116 through a high-speed bus 1136.

The high-speed bus 1136 may be accessed through a context multiplexer 1132 controlled by the XPU 1130 and a bus interface circuit 1122. The context multiplexer 1132 may select between the output of the serial interface engine 1112 and inputs received from multiple execution environments 1104, 1106. In some instances, one or more of the execution environments 1104, 1106 may be provided with direct access to another serial engine 1118. For example, a modem may have direct access to the other serial engine 1118. The modem may be provided direct access to the serial engine 1118 to enable latency-sensitive coexistence messages to be efficiently transmitted to multiple RFFE devices. The output of the serial interface engine 1112 may provide a secured channel for one or more of the execution environments 1104, 1106. The XPU 1130 may configure a current context based on addresses of transmitters or receivers located in an execution environments 1104, 1106 or addresses of slave devices in external peripherals. The XPU 1130 may include or be coupled to an XPU address decoder 1114.

The ACC 1142 may examine slave ID and the identity of the requesting execution environment for every requested transfer or transaction over a secured channel is configured using a shared serial bus. The ACC 1142 may examine other relevant attributes when authorizing a requested transfer or transaction over the secured channel. According to one aspect, the lookup table 1146 and/or certain registers defining the access control policy may be locked such that commands received over the shared serial bus cannot modify the access control policy. Locking the lookup table 1146 and/or the registers that define the access control policy can prevent unauthorized accesses by a rogue slave device or malicious agent.

Certain aspects of this disclosure enable a serial interface to be shared for use with secured and unsecured communication. Secured communication may require that a communication link is dedicated for the use of a single host device and a single subordinate device. This ability to share the serial interface can support infrequent secured usage while providing an unsecured shared link for a majority of the time, thereby conserving die space and GPIO pins or interconnects. In one example, at least two GPIO pads may be saved for every serial engine that is shared.

Certain aspects of this disclosure provide multiple methods for enforcing access policy inside a peripheral controller. In one method of enforcing access policy, an XPU that enforces the access policy may be used by the peripheral controller for multiple functions. The XPU may enforce access policy based on an extended device address that includes a slave ID configured in accordance with a serial bus protocol and a serial engine ID or a corresponding serial bus ID. In one example, the access policy may be enforced using an XPU that is provided in the peripheral controller for other reasons. In another example, the access policy may be enforced using an XPU that is provided in a serial engine or controller associated with a serial engine. The serial engine or a corresponding serial bus may be characterized as a shared resource available to multiple execution environments. The XPU may be configured to enforce access policy by examining a combination of a slave ID and a serial bus ID in the context of an execution environment from which the transfer is initiated.

In another method of enforcing access policy, a lookup table may be configured for a shared serial bus. The lookup table may be implemented with a controller or combinational logic that is implemented in hardware. In some instances, the controller or combinational logic may override security attributes for certain non-secure transfers based on information provided in the lookup table. The non-secure transfers may be permitted to be executed over a serial bus shared with a secure slave. In one aspect, the serial bus and its associated serial engine may be characterized as a resource assigned to a secured execution environment. The controller or combinational logic may examine or compare a combination of a slave ID and a serial bus ID with information in the lookup table and may provide serial bus access to a permitted unsecured slave when the secured execution environment is not currently accessing the shared serial bus. The unsecured slave may be provided with access to the shared serial bus by updating or upgrading security attributes used to enforce access policy.

In another method of enforcing access policy, a combination of an XPU and lookup table may be used to enforce access policy regarding a shared serial bus. The lookup table may be used to filter incoming traffic directed to the shared serial bus. The use of such filtering can lessen the overhead associated with the XPU. In one example, the controller or combinational logic may determine from the lookup table whether a targeted serial bus is a shared bus before forwarding the transaction to the XPU. The XPU may then enforce the access policy by examining the slave ID and the serial bus ID in the context of the execution environment that originated the transfer.

Certain concepts disclosed herein are applicable in a variety of use-cases. In one example, a serial bus can be shared between peripherals that support near field communication (NFC) and embedded Secure Element (eSE) communication. Certain NFC applications can operate with an unsecured communication channel, whereas eSE is used for secure mobile transaction applications and typically requires a secured communication channel. In another example, fingerprint and heart rate monitor applications can involve a mix of secured and unsecured communication channels.

Figure 12:
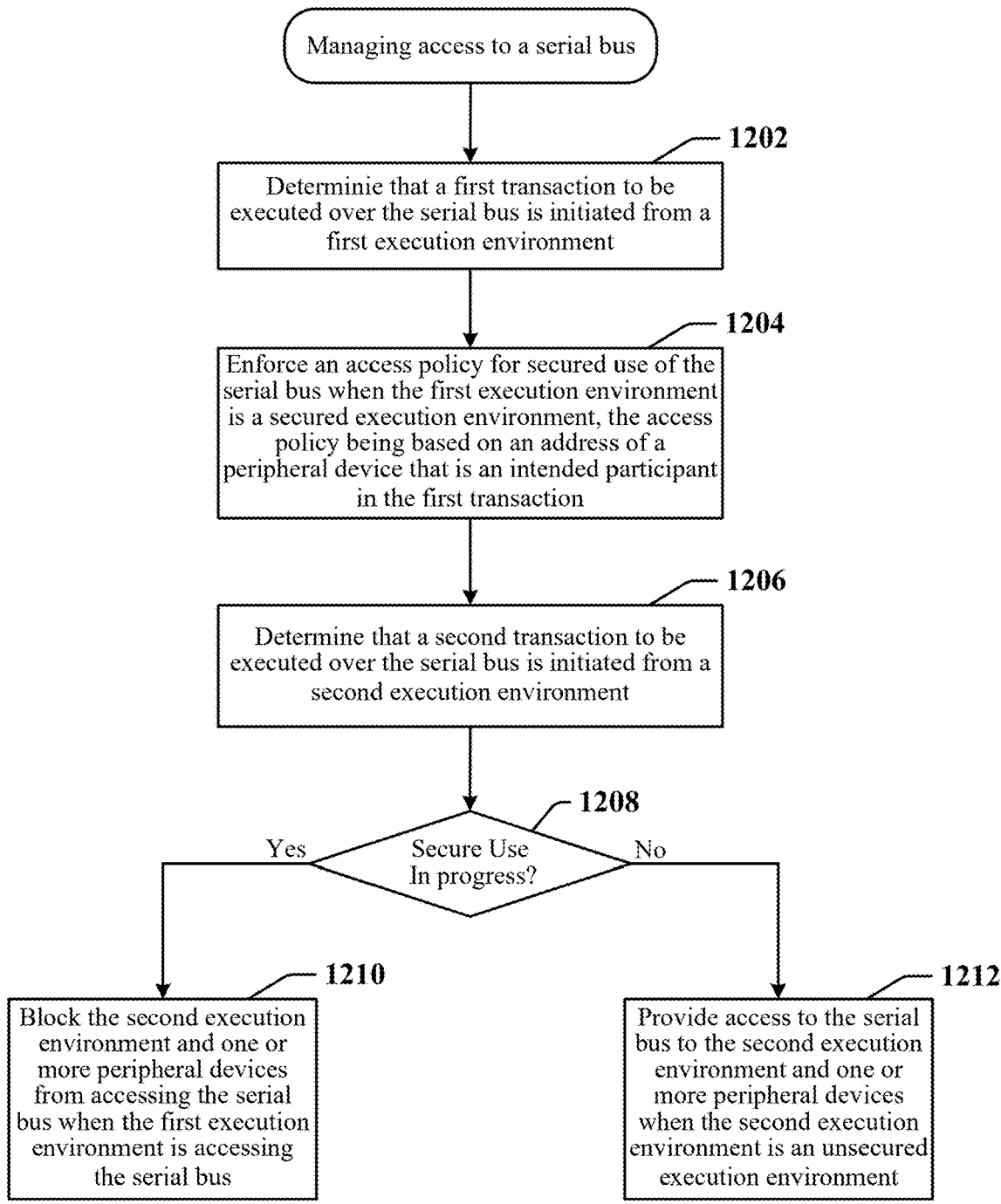
FIG. 12 is a flowchart of a method for managing access to a serial bus in accordance with certain aspects of this disclosure.

FIG. 12 is a flowchart 1200 of a method for managing access to a serial bus in accordance with certain aspects of this disclosure. In some instances, the method is implemented using a processor, a controller, a finite state machine or some combination of processors, controllers and finite state machines.

At block 1202 in the illustrated method, it may be determined whether a first transaction to be executed over the serial bus is initiated from a first execution environment. At block 1204 in the illustrated method, an access policy for secured use of the serial bus may be enforced when the first execution environment is a secured execution environment. The access policy may be based on an address of a peripheral device that is an intended participant in the first transaction. At block 1206 in the illustrated method, it may be determined that a second transaction to be executed over the serial bus is initiated from a second execution environment. At block 1208 in the illustrated method, it may be determined whether the first execution environment is accessing the serial bus. If the first execution environment is accessing the serial bus, then at block 1210 the second execution environment and one or more peripheral devices may be blocked from accessing the serial bus. If the first execution environment is not accessing the serial bus, then at block 1212 access to the serial bus may be provided to the second execution environment and one or more peripheral devices when the second execution environment is an unsecured execution environment. In some implementations, the address of the peripheral device that is an intended participant in the first transaction includes a subordinate device identifier assigned according to a bus protocol and an identifier of the serial bus.

In some implementations, the access policy is enforced at a serial engine coupled to the serial bus. The serial engine may be shared by the first execution environment and the second execution environment. In other implementations, the access policy is enforced by an access control circuit in a peripheral controller that includes the serial engine. The serial engine may be shared by the first execution environment and the second execution environment. The access policy may be enforced using a lookup table to identify aspects of the access policy that relate to a command in the first transaction. The access policy may be enforced using a lookup table to identify aspects of the access policy that relate to the first execution environment. The access policy may be enforced using a lookup table to identify aspects of the access policy that relate to the address of the peripheral device. The access policy may be enforced using a lookup table to identify authorized participants to the transaction and an authorized command. The first transaction may be permitted to be executed over the serial bus when an authorized participant and command are identified using the lookup table.

The method illustrated in FIG. 16 may be executed in or using an IC device. The IC device may include multiple semiconductor dice mounted on a substrate. In certain applications, at least one semiconductor die may be stacked on at least one other semiconductor die within an IC package. Each semiconductor die includes at least one circuit block configured to implement a function of the IC device.

The IC device may include a peripheral controller that includes a serial engine configured to provide an interface to a serial bus, a multiplexer configured to select between transactions directed to the serial bus and initiated in a plurality of execution environments, and an access control circuit. The access control circuit may be configured to determine when a first transaction to be executed over the serial bus is initiated from a first execution environment, enforce an access policy when the first execution environment is a secured execution environment, determine when a second transaction to be executed over the serial bus is initiated from a second execution environment, block the second execution environment and one or more peripheral devices from accessing the serial bus when the first execution environment is accessing the serial bus, and provide the second execution environment and one or more peripheral devices with access to the serial bus when the second execution environment is an unsecured execution environment. The access policy may be based on an address of a peripheral device that is an intended participant in the first transaction. In some implementations, the address of the peripheral device that is an intended participant in the first transaction may include a subordinate device identifier assigned according to a bus protocol and an identifier of the serial bus.

In some implementations, the access control circuit is provided in the serial engine. In other implementations, the access control circuit is provided in a peripheral controller that includes the serial engine. The access control circuit may include a lookup table that identifies aspects of the access policy relating to a command in the first transaction. The access control circuit may include a lookup table that identifies aspects of the access policy that relate to the first execution environment. The access control circuit may include a lookup table that identifies aspects of the access policy that relate to the address of the peripheral device. The access control circuit may include a lookup table that identifies authorized participants to the transaction and an authorized command. The access control circuit may be further configured to permit the first transaction to be executed over the serial bus when an authorized participant and an authorized command are identified by the lookup table.

In various aspects of the disclosure, a processor-readable storage medium that stores code that, when executed by a processor causes a processing circuit to determine when a first transaction to be executed over the serial bus is initiated from a first execution environment, enforce an access policy for secured use of the serial bus when the first execution environment is a secured execution environment, determine when a second transaction to be executed over the serial bus is initiated from a second execution environment, block the second execution environment and one or more peripheral devices from accessing the serial bus when the first execution environment is accessing the serial bus, and provide access to the serial bus to the second execution environment and one or more peripheral devices when the second execution environment is an unsecured execution environment. The access policy may be based on an address of a peripheral device that is an intended participant in the first transaction.

In some examples, the access policy is enforced at a serial engine coupled to the serial bus. The serial engine may be shared by the first execution environment and the second execution environment. In some examples, the access policy is enforced by an access control circuit in a peripheral controller that includes a serial engine coupled to the serial bus. In some examples, the code further causes the processing circuit to use a lookup table to identify aspects of the access policy that relate to a command in the first transaction, the first execution environment or the address of the peripheral device.

Some implementation examples are described in the following numbered clauses:

1. A peripheral controller, comprising: a serial engine configured to provide an interface to a serial bus; a multiplexer configured to select between transactions directed to the serial bus and initiated in a plurality of execution environments; and an access control circuit configured to: determine when a first transaction to be executed over the serial bus is initiated from a first execution environment; enforce an access policy when the first execution environment is a secured execution environment, the access policy being based on an address of a peripheral device that is an intended participant in the first transaction; determine when a second transaction to be executed over the serial bus is initiated from a second execution environment; block the second execution environment and one or more peripheral devices from accessing the serial bus when the first execution environment is accessing the serial bus; and provide the second execution environment and one or more peripheral devices with access to the serial bus when the second execution environment is an unsecured execution environment.

2. The peripheral controller as described in clause 1, wherein the address of the peripheral device that is an intended participant in the first transaction comprises a subordinate device identifier assigned according to a bus protocol and an identifier of the serial bus.

3. The peripheral controller as described in clause 1 or clause 2, wherein the access control circuit is provided in the serial engine.

4. The peripheral controller as described in clause 1 or clause 2, wherein the access control circuit is provided in a peripheral controller that includes the serial engine.

5. The peripheral controller as described in any of clauses 1-4, wherein the access control circuit comprises: a lookup table that identifies aspects of the access policy relating to a command in the first transaction.

6. The peripheral controller as described in any of clauses 1-5, wherein the access control circuit comprises: a lookup table that identifies aspects of the access policy that relate to the first execution environment.

7. The peripheral controller as described in any of clauses 1-6, wherein the access control circuit comprises: a lookup table that identifies aspects of the access policy that relate to the address of the peripheral device.

8. The peripheral controller as described in any of clauses 1-7, wherein the access control circuit comprises: a lookup table that identifies authorized participants to the transaction and an authorized command, and wherein the access control circuit is further configured to: permit the first transaction to be executed over the serial bus when an authorized participant and an authorized command are identified by the lookup table.

9. A method for managing access to a serial bus, comprising: determining that a first transaction to be executed over the serial bus is initiated from a first execution environment; enforcing an access policy for secured use of the serial bus when the first execution environment is a secured execution environment, the access policy being based on an address of a peripheral device that is an intended participant in the first transaction; determining that a second transaction to be executed over the serial bus is initiated from a second execution environment; blocking the second execution environment and one or more peripheral devices from accessing the serial bus when the first execution environment is accessing the serial bus; and providing access to the serial bus to the second execution environment and one or more peripheral devices when the second execution environment is an unsecured execution environment.

10. The method as described in clause 9, wherein the address of the peripheral device that is an intended participant in the first transaction comprises a subordinate device identifier assigned according to a bus protocol and an identifier of the serial bus.

11. The method as described in clause 9 or clause 10, wherein the access policy is enforced at a serial engine coupled to the serial bus, and wherein the serial engine is shared by the first execution environment and the second execution environment.

12. The method as described in any of clauses 9-11, wherein the access policy is enforced by an access control circuit in a peripheral controller that includes a serial engine coupled to the serial bus, and wherein the serial engine is shared by the first execution environment and the second execution environment.

13. The method as described in any of clauses 9-12, wherein enforcing the access policy comprises: using a lookup table to identify aspects of the access policy that relate to a command in the first transaction.

14. The method as described in any of clauses 9-13, wherein enforcing the access policy comprises: using a lookup table to identify aspects of the access policy that relate to the first execution environment.

15. The method as described in any of clauses 9-14, wherein enforcing the access policy comprises: using a lookup table to identify aspects of the access policy that relate to the address of the peripheral device.

16. The method as described in any of clauses 9-15, wherein enforcing the access policy comprises: using a lookup table to identify authorized participants to the transaction and an authorized command; and permitting the first transaction to be executed over the serial bus when an authorized participant and command are identified using the lookup table.

17. A processor-readable storage medium storing code thereon, the code when executed by a processor causes a processing circuit to: determine when a first transaction to be executed over the serial bus is initiated from a first execution environment; enforce an access policy for secured use of the serial bus when the first execution environment is a secured execution environment, the access policy being based on an address of a peripheral device that is an intended participant in the first transaction; determine when a second transaction to be executed over the serial bus is initiated from a second execution environment; block the second execution environment and one or more peripheral devices from accessing the serial bus when the first execution environment is accessing the serial bus; and provide access to the serial bus to the second execution environment and one or more peripheral devices when the second execution environment is an unsecured execution environment.

18. The processor-readable storage medium as described in clause 17, wherein the access policy is enforced at a serial engine coupled to the serial bus, and wherein the serial engine is shared by the first execution environment and the second execution environment.

19. The processor-readable storage medium as described in clause 17 or clause 18, wherein the access policy is enforced by an access control circuit in a peripheral controller that includes a serial engine coupled to the serial bus, and wherein the serial engine is shared by the first execution environment and the second execution environment.

20. The processor-readable storage medium as described in any of clauses 17-19, wherein the code further causes the processing circuit to: using a lookup table to identify aspects of the access policy that relate to a command in the first transaction, the first execution environment or the address of the peripheral device.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:
1. A peripheral controller, comprising:
a serial engine configured to provide an interface to a serial bus;
a multiplexer configured to select between transactions directed to the serial bus and initiated in a plurality of execution environments; and
an access control circuit configured to:
determine when a first transaction to be executed over the serial bus is initiated from a first execution environment;

enforce an access policy when the first execution environment is a secured execution environment, the access policy being based on an address of a peripheral device that is an intended participant in the first transaction;

determine when a second transaction to be executed over the serial bus is initiated from a second execution environment;

block the second execution environment and one or more peripheral devices from accessing the serial bus when the first execution environment is accessing the serial bus; and provide the second execution environment and one or more peripheral devices with access to the serial bus when the second execution environment is an unsecured execution environment.

2. The peripheral controller of claim 1, wherein the address of the peripheral device that is an intended participant in the first transaction comprises a subordinate device identifier assigned according to a bus protocol and an identifier of the serial bus.

3. The peripheral controller of claim 1, wherein the access control circuit is provided in the serial engine.

4. The peripheral controller of claim 1, wherein the access control circuit is provided in a peripheral controller that includes the serial engine.

5. The peripheral controller of claim 1, wherein the access control circuit comprises:
a lookup table that identifies aspects of the access policy relating to a command in the first transaction.

6. The peripheral controller of claim 1, wherein the access control circuit comprises:
a lookup table that identifies aspects of the access policy that relate to the first execution environment.

7. The peripheral controller of claim 1, wherein the access control circuit comprises:
a lookup table that identifies aspects of the access policy that relate to the address of the peripheral device.

8. The peripheral controller of claim 1, wherein the access control circuit comprises:
a lookup table that identifies authorized participants to the first transaction and an authorized command, and wherein the access control circuit is further configured to:
permit the first transaction to be executed over the serial bus when an authorized participant and an authorized command are identified by the lookup table.

9. A method for managing access to a serial bus, comprising:
determining that a first transaction to be executed over the serial bus is initiated from a first execution environment;
enforcing an access policy for secured use of the serial bus when the first execution environment is a secured execution environment, the access policy being based on an address of a peripheral device that is an intended participant in the first transaction;
determining that a second transaction to be executed over the serial bus is initiated from a second execution environment;
blocking the second execution environment and one or more peripheral devices from accessing the serial bus when the first execution environment is accessing the serial bus; and
providing access to the serial bus to the second execution environment and one or more peripheral devices when the second execution environment is an unsecured execution environment.

10. The method of claim 9, wherein the address of the peripheral device that is an intended participant in the first transaction comprises a subordinate device identifier assigned according to a bus protocol and an identifier of the serial bus.

11. The method of claim 9, wherein the access policy is enforced at a serial engine coupled to the serial bus, and wherein the serial engine is shared by the first execution environment and the second execution environment.

12. The method of claim 9, wherein the access policy is enforced by an access control circuit in a peripheral controller that includes a serial engine coupled to the serial bus, and wherein the serial engine is shared by the first execution environment and the second execution environment.

13. The method of claim 9, wherein enforcing the access policy comprises:
using a lookup table to identify aspects of the access policy that relate to a command in the first transaction.

14. The method of claim 9, wherein enforcing the access policy comprises:
using a lookup table to identify aspects of the access policy that relate to the first execution environment.

15. The method of claim 9, wherein enforcing the access policy comprises:
using a lookup table to identify aspects of the access policy that relate to the address of the peripheral device.

16. The method of claim 9, wherein enforcing the access policy comprises:
using a lookup table to identify authorized participants to the first transaction and an authorized command; and
permitting the first transaction to be executed over the serial bus when an authorized participant and command are identified using the lookup table.

17. A non-transitory processor-readable storage medium storing code thereon, the code when executed by a processor causes a processing circuit to:
determine when a first transaction to be executed over a serial bus is initiated from a first execution environment;
enforce an access policy for secured use of the serial bus when the first execution environment is a secured execution environment, the access policy being based on an address of a peripheral device that is an intended participant in the first transaction;
determine when a second transaction to be executed over the serial bus is initiated from a second execution environment;
block the second execution environment and one or more peripheral devices from accessing the serial bus when the first execution environment is accessing the serial bus; and
provide access to the serial bus to the second execution environment and one or more peripheral devices when the second execution environment is an unsecured execution environment.

18. The non-transitory processor-readable storage medium of claim 17, wherein the access policy is enforced at a serial engine coupled to the serial bus, and wherein the serial engine is shared by the first execution environment and the second execution environment.

19. The non-transitory processor-readable storage medium of claim 17, wherein the access policy is enforced by an access control circuit in a peripheral controller that includes a serial engine coupled to the serial bus, and wherein the serial engine is shared by the first execution environment and the second execution environment.

20. The non-transitory processor-readable storage medium of claim 17, wherein the code further causes the processing circuit to:
   using a lookup table to identify aspects of the access policy that relate to a command in the first transaction, the first execution environment or the address of the peripheral device.

* * * * *